(12) United States Patent
Royak et al.

(10) Patent No.: US 10,158,314 B2
(45) Date of Patent: Dec. 18, 2018

(54) FEEDFORWARD CONTROL OF MOTOR DRIVES WITH OUTPUT SINEWAVE FILTER

(71) Applicant: Rockwell Automation Technologies, Inc., Mayfield Heights, OH (US)

(72) Inventors: Semyon Royak, Orange Village, OH (US); Jingya Dai, Burnaby (CA); Thomas A. Nondahl, Greenfield, WI (US); Jingbo Liu, Grafton, WI (US); Robert J. Breitzmann, South Russell, OH (US); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/421,576

(22) Filed: Feb. 1, 2017

(65) Prior Publication Data
US 2017/0141712 A1  May 18, 2017

Related U.S. Application Data

(63) Continuation-in-part of application No. 15/053,135, filed on Feb. 25, 2016, now abandoned, and a
(Continued)

(51) Int. Cl.
*H02P 21/06* (2016.01)
*H02P 27/06* (2006.01)
(Continued)

(52) U.S. Cl.
CPC ............ *H02P 27/06* (2013.01); *H02M 1/126* (2013.01); *H02M 7/53873* (2013.01);
(Continued)

(58) Field of Classification Search
CPC .... H02P 21/0035; H02P 21/06; H02P 21/146; H02P 27/08; H02M 5/4505; H02M 7/53878
(Continued)

(56) References Cited

U.S. PATENT DOCUMENTS

| 3,723,840 A | 3/1973 | Opal et al. |
| 4,823,251 A | 4/1989 | Kawabata et al. |

(Continued)

FOREIGN PATENT DOCUMENTS

| CN | 2513286 Y | 9/2002 |
| CN | 101385385 A | 3/2009 |

(Continued)

OTHER PUBLICATIONS

"Guidelines for the Use of 400-600 Volt AC Drives in Medium Voltage Applications," Yaskawa Application Note, Jun. 7, 2005.
(Continued)

*Primary Examiner* — Rina Duda
(74) *Attorney, Agent, or Firm* — Fay Sharpe LLP

(57) ABSTRACT

Disclosed examples include power conversion systems and methods to operate an inverter to drive a motor load through an intervening output filter, a transformer and a cable, including a current regulator to compute a command value according to a current reference value and a motor current feedback value, a cross-coupled feedforward component to compensate the command value by an estimated cross-coupled voltage value to compute a control output value, a cross-coupled object component to compute the motor current feedback value according to a voltage value using a plant transfer function representing the output filter, the transformer, the cable and the motor load, and a controller to provide the inverter switching control signals to control the inverter according to the control output value.

16 Claims, 21 Drawing Sheets

Related U.S. Application Data continuation-in-part of application No. 14/555,769, filed on Nov. 28, 2014, now Pat. No. 9,294,019, which is a continuation of application No. 13/742,405, filed on Jan. 16, 2013, now Pat. No. 9,124,209, said application No. 15/053,135 is a continuation-in-part of application No. 14/666,894, filed on Mar. 24, 2015, now Pat. No. 9,312,779, which is a continuation of application No. 13/868,216, filed on Apr. 23, 2013, now Pat. No. 9,054,621, said application No. 15/053,135 is a continuation-in-part of application No. 14/193,329, filed on Feb. 28, 2014, now Pat. No. 9,287,812, which is a continuation-in-part of application No. 13/931,839, filed on Jun. 29, 2013, now Pat. No. 9,054,611.

(60) Provisional application No. 62/212,063, filed on Aug. 31, 2015.

(51) Int. Cl.
  *H02M 1/12* (2006.01)
  *H02M 7/5387* (2007.01)
  *H02P 6/08* (2016.01)
  *H02P 21/13* (2006.01)
  *H02P 21/22* (2016.01)
  *H02P 21/18* (2016.01)
  *H02M 1/00* (2006.01)

(52) U.S. Cl.
  CPC .......... *H02P 6/08* (2013.01); *H02P 21/13* (2013.01); *H02P 21/18* (2016.02); *H02P 21/22* (2016.02); *H02M 2001/0009* (2013.01)

(58) Field of Classification Search
  USPC ....... 318/400.01, 400.02, 798–801, 599, 811
  See application file for complete search history.

(56) References Cited

U.S. PATENT DOCUMENTS

| | | | |
|---|---|---|---|
| 5,032,771 A | 7/1991 | Kerkman | |
| 5,526,252 A | 6/1996 | Erdman | |
| 5,703,449 A | 12/1997 | Nagate | |
| 5,717,305 A | 2/1998 | Seibel | |
| 5,744,921 A | 4/1998 | Makaran | |
| 5,909,098 A | 6/1999 | Konecny et al. | |
| 5,959,431 A | 9/1999 | Xiang | |
| 5,990,654 A * | 11/1999 | Skibinski | H02M 1/126 307/105 |
| 5,994,869 A | 11/1999 | Becerra | |
| 6,121,736 A | 9/2000 | Narazaki et al. | |
| 6,124,697 A | 9/2000 | Wilkerson | |
| 6,208,537 B1 | 3/2001 | Skibinski et al. | |
| 6,222,335 B1 | 4/2001 | Hiti et al. | |
| 6,329,781 B1 | 12/2001 | Matsui et al. | |
| 6,600,980 B1 | 7/2003 | Kraska et al. | |
| 6,940,249 B2 | 9/2005 | Toyoda | |
| 6,965,212 B1 | 11/2005 | Wang et al. | |
| 7,045,988 B2 | 5/2006 | Ha et al. | |
| 7,049,778 B2 | 5/2006 | Katanaya | |
| 7,084,604 B2 | 8/2006 | Salomaki | |
| 7,102,323 B2 | 9/2006 | Zhou et al. | |
| 7,468,595 B2 | 12/2008 | Lee | |
| 7,679,308 B2 | 3/2010 | Tomigashi | |
| 7,683,568 B2 | 3/2010 | Pande et al. | |
| 7,724,549 B2 | 5/2010 | Skibinski et al. | |
| 7,729,146 B2 | 6/2010 | Hayami et al. | |
| 7,920,393 B2 * | 4/2011 | Bendre | H02M 7/487 363/127 |
| 7,932,693 B2 | 4/2011 | Lee | |
| 7,979,223 B2 | 7/2011 | Monti et al. | |
| 7,990,097 B2 | 8/2011 | Cheng et al. | |
| 8,009,450 B2 | 8/2011 | Royak et al. | |
| 8,143,838 B2 | 3/2012 | Akiyama | |
| 8,217,602 B2 | 7/2012 | Ikei | |
| 8,232,760 B2 | 7/2012 | Lu et al. | |
| 8,288,886 B2 | 10/2012 | Anwar et al. | |
| 8,299,646 B2 | 10/2012 | Rockenfeller et al. | |
| 8,350,507 B2 | 1/2013 | Ito | |
| 8,541,971 B2 | 9/2013 | Sakai | |
| 8,736,220 B2 | 5/2014 | Ogawa et al. | |
| 8,890,450 B2 | 11/2014 | Maekawa | |
| 8,970,154 B2 | 3/2015 | Ishikawa et al. | |
| 8,981,702 B2 | 3/2015 | Katariya et al. | |
| 9,240,733 B2 | 1/2016 | Royak et al. | |
| 2004/0052097 A1 | 3/2004 | Morimoto | |
| 2005/0012339 A1* | 1/2005 | Mikhail | F03D 7/0224 290/44 |
| 2006/0113952 A1 | 6/2006 | Zhou | |
| 2007/0001635 A1 | 1/2007 | Ho | |
| 2007/0007929 A1 | 1/2007 | Lee et al. | |
| 2008/0001571 A1 | 1/2008 | Tomigashi | |
| 2008/0074074 A1* | 3/2008 | Skibinski | H02M 7/003 318/800 |
| 2008/0300820 A1* | 12/2008 | Hu | H02P 21/06 702/147 |
| 2008/0312855 A1 | 12/2008 | Monti et al. | |
| 2009/0146592 A1 | 6/2009 | Tobari et al. | |
| 2009/0153083 A1 | 6/2009 | Rozman | |
| 2009/0200980 A1 | 8/2009 | Ramu et al. | |
| 2011/0062908 A1 | 3/2011 | Kitanaka | |
| 2011/0084638 A1 | 4/2011 | Patel et al. | |
| 2011/0109155 A1 | 5/2011 | Anwar et al. | |
| 2011/0181232 A1 | 7/2011 | Krishnamoorthy et al. | |
| 2012/0038300 A1 | 2/2012 | Kato et al. | |
| 2012/0081061 A1* | 4/2012 | Zargari | H02J 3/01 318/503 |
| 2012/0268056 A1 | 10/2012 | Liu | |
| 2013/0063059 A1* | 3/2013 | Chi | H02P 27/08 318/400.13 |
| 2013/0153180 A1 | 6/2013 | Montocchio et al. | |
| 2013/0187579 A1* | 7/2013 | Rozman | H02P 6/10 318/400.02 |
| 2014/0197774 A1 | 7/2014 | Liu et al. | |
| 2014/0228980 A1 | 8/2014 | Ohta et al. | |
| 2014/0265952 A1 | 9/2014 | Katariya et al. | |
| 2014/0312811 A1 | 10/2014 | Liu et al. | |
| 2015/0002059 A1 | 1/2015 | Liu et al. | |
| 2015/0002067 A1 | 1/2015 | Rowan et al. | |
| 2015/0123579 A1 | 5/2015 | Liu et al. | |

FOREIGN PATENT DOCUMENTS

| | | |
|---|---|---|
| CN | 201504207 U | 6/2010 |
| CN | 101950983 A | 1/2011 |
| CN | 102045021 A1 | 5/2011 |
| CN | 102349230 A | 2/2012 |
| CN | 202872721 U | 4/2013 |
| CN | 103190068 A | 7/2013 |
| EP | 1635448 A1 | 3/2006 |
| EP | 1868288 A1 | 12/2007 |
| GB | 2390766 A | 1/2004 |
| JP | 2001-025282 | 1/2001 |
| JP | 2002034289 A | 1/2002 |
| WO | WO2009093214 A2 | 7/2009 |

OTHER PUBLICATIONS

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE 13$^{th}$ Int'l Conf. on Optimization of Electrical and Electronic Equipment (OPTIM), May 2012, pp. 432-438.

(56) References Cited

OTHER PUBLICATIONS

Batzel, Todd D. et al., "*Electric Propulsion With Sensorless Permanent Magnet Synchronous Motor: Implementation and Performance*", IEEE Transactions on Energy Conversion, vol. 20, No. 3, pp. 575-583, Sep. 2005.

Carpaneto, et al., "A New Sensorless Permanent Magnet Synchronous Motor Algorithm Based on Algebraic Method"; 13th European Conf. on Power Electronics and Applications, 2009; EPE 2009; Sep. 8-10, 2009, Barcelona, Spain; IEEE, Piscataway, NJ, Sep. 8, 2009, pp. 1-10.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kim et al., "PWM Switching Frequency Signal Injection Sensorless Methods in IPMSM", IEEE, 2011, pp. 3021-3028.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kobayashi et al., "Investigation of IPMSM's Position Estimation in Low Speed Region with DC Link Current Detection", IEEE Jan. 2007, pp. 1411-1416.

Kojima, Mari et al., "*Novel Vector Control System Using Deadbeat-Controlled PWM Inverter With Output LC Filter*", IEEE Transactions on Industry Applications, vol. 40, No. 1, pp. 162-169, Jan./Feb. 2004.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Miranda et al., "Parameter and Speed Estimation for Implementing Low Speed Sensorless PMSM Drive System Based on an Algebraic Method"; Applied Power Electronics Conf.; APEC 2007, 22nd Annual IEEE; Feb. 1, 2007,;pp. 1406-1410.

Miranda et al., "Sensorless Control of a PMSM Synchronous Motor at Low Speed"; IEEE Industrial, Electronics; IECON 2006; 32nd Annual Conf., IEEE; Piscataway, NJ; Nov. 1, 2006; pp. 5069-5074.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992

Park et al., "Design and Control of High-Speed Solid-Rotor Synchronous Reluctance Drive With Three-Phase LC Filter", Conference Record of the 2005 IEEE Industry Applications Conf. 40th IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", in Proceedings of the 32nd Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Stirban et al., "Motion-Sensorless Control of BLDC-PM Motor With Offline FEM Information Assisted State Observer"; Optimization of Electrical and Electronic Equipment (OPTIM), 2010 12th International Conference, Ma 22, 2010, pp. 321-328.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

Yim et al., "A Predictive Current Control Associated to EKF for High Performance IPMSM Drives"; Applied Power Electronics Conf. and Exposition (APEC), 2011; 26th Annual IEEE, Mar. 6, 2011; pp. 1010-1016.

* cited by examiner

FEEDFORWARD CONTROL OF MOTOR DRIVES WITH OUTPUT SINEWAVE FILTER

REFERENCE TO RELATED APPLICATIONS

This application is a continuation-in-part of, and claims priority to and the benefit of, U.S. patent application Ser. No. 15/053,135, filed on Feb. 25, 2016, entitled SENSORLESS MOTOR DRIVE VECTOR CONTROL WITH FEEDBACK COMPENSATION FOR FILTER CAPACITOR CURRENT, which claims, under 35 USC § 119, priority to, and the benefit of U.S. Provisional Application Ser. No. 62/212,063, filed on Aug. 31, 2015 and entitled CONTROL OF MOTOR DRIVES WITH OUTPUT SINE WAVE FILTER CAPACITOR CURRENT, and U.S. patent application Ser. No. 14/555,769 is a continuation-in-part of, and claims priority to and the benefit of, U.S. patent application Ser. No. 14/555,769, filed on Nov. 28, 2014, entitled METHOD AND APPARATUS FOR CONTROLLING POWER CONVERTER WITH INVERTER OUTPUT FILTER, and U.S. patent application Ser. No. 14/555,769 is a continuation of U.S. patent application Ser. No. 13/742,405, filed on Jan. 16, 2013, entitled METHOD AND APPARATUS FOR CONTROLLING POWER CONVERTER WITH INVERTER OUTPUT FILTER and granted on Sep. 1, 2015 as U.S. Pat. No. 9,124,209 to Liu et al., and U.S. patent application Ser. No. 15/053,135 is a continuation-in-part of, and claims priority to and the benefit of, U.S. patent application Ser. No. 14/666,894, filed on Mar. 24, 2015, entitled POSITION SENSORLESS OPEN LOOP CONTROL FOR MOTOR DRIVES WITH OUTPUT FILTER AND TRANSFORMER, and U.S. patent application Ser. No. 14/666,894 is a continuation of U.S. patent application Ser. No. 13/868,216, filed on Apr. 23, 2013, entitled POSITION SENSORLESS OPEN LOOP CONTROL FOR MOTOR DRIVES WITH OUTPUT FILTER AND TRANSFORMER and granted on Jun. 9, 2015 as U.S. Pat. No. 9,054,621 to Liu et al., and U.S. patent application Ser. No. 15/053,135 is a continuation-in-part of, and claims priority to and the benefit of, U.S. patent application Ser. No. 14/193,329, filed on Feb. 28, 2014, entitled METHOD AND APPARATUS FOR STABILITY CONTROL OF OPEN LOOP MOTOR DRIVE OPERATION, and U.S. patent application Ser. No. 14/193,329 is a continuation-in-part of U.S. patent application Ser. No. 13/931,839, filed on Jun. 29, 2013, entitled METHOD AND APPARATUS FOR STABILITY CONTROL OF OPEN LOOP MOTOR DRIVE OPERATION and granted on Jun. 9, 2015 as U.S. Pat. No. 9,054,611 to Liu et al. The entireties of all the above applications and granted patents are hereby incorporated by reference.

INCORPORATION BY REFERENCE

The following U.S. patents, patent applications and published patent applications are hereby incorporated by reference in their entireties: U.S. Pat. No. 9,124,209 issued Sep. 1, 2015 to Liu et al., entitled METHOD AND APPARATUS FOR CONTROLLING POWER CONVERTER WITH INVERTER OUTPUT FILTER; U.S. Patent Application Publication No. 2015/0123579 A1 to Liu et al., entitled METHOD AND APPARATUS FOR CONTROLLING POWER CONVERTER WITH INVERTER OUTPUT FILTER, and filed as U.S. patent application Ser. No. 14/555,769 on Nov. 28, 2014; U.S. Pat. No. 9,054,621 issued Jun. 9, 2015 to Liu et al., entitled POSITION SENSORLESS OPEN LOOP CONTROL FOR MOTOR DRIVES WITH OUTPUT FILTER AND TRANSFORMER; U.S. Patent Application Publication No. 2015/0194901 A1 to Liu et al., entitled POSITION SENSORLESS OPEN LOOP CONTROL FOR MOTOR DRIVES WITH OUTPUT FILTER AND TRANSFORMER, and filed as U.S. patent application Ser. No. 14/666,894 on Mar. 24, 2015; U.S. Pat. No. 9,054,611 issued Jun. 9, 2015 to Liu et al., entitled METHOD AND APPARATUS FOR STABILITY CONTROL OF OPEN LOOP MOTOR DRIVE OPERATION; U.S. Patent Application Publication No. 2015/0002067 A1 to Nondahl et al., entitled METHOD AND APPARATUS FOR STABILITY CONTROL OF OPEN LOOP MOTOR DRIVE OPERATION, and filed as U.S. patent application Ser. No. 14/193,329 on Feb. 28, 2014; U.S. patent application Ser. No. 14/565,781 filed Dec. 10, 2014 to Nondahl et al., entitled TRANSITION SCHEME FOR POSITION SENSORLESS CONTROL OF AC MOTOR DRIVES; and U.S. patent application Ser. No. 15/351,989 filed Nov. 15, 2016 to Royak et al., entitled CURRENT CONTROL OF MOTOR DRIVES WITH OUTPUT SINEWAVE FILTER.

BACKGROUND INFORMATION

The subject matter disclosed herein relates to power conversion, and more specifically to feedforward control of a power converter.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems and methods to operate an inverter to drive a motor load through an intervening output filter, a transformer and a cable, including a current regulator to compute a command value according to a current reference value and a motor current feedback value, a cross-coupled feedforward component to compensate the command value by an estimated cross-coupled voltage value to compute a control output value, a cross-coupled object component to compute the motor current feedback value according to a voltage value using a plant transfer function representing the output filter, the transformer, the cable and the motor load, and a controller to provide the inverter switching control signals to control the inverter according to the control output value.

DETAILED DESCRIPTION

Figure 1:
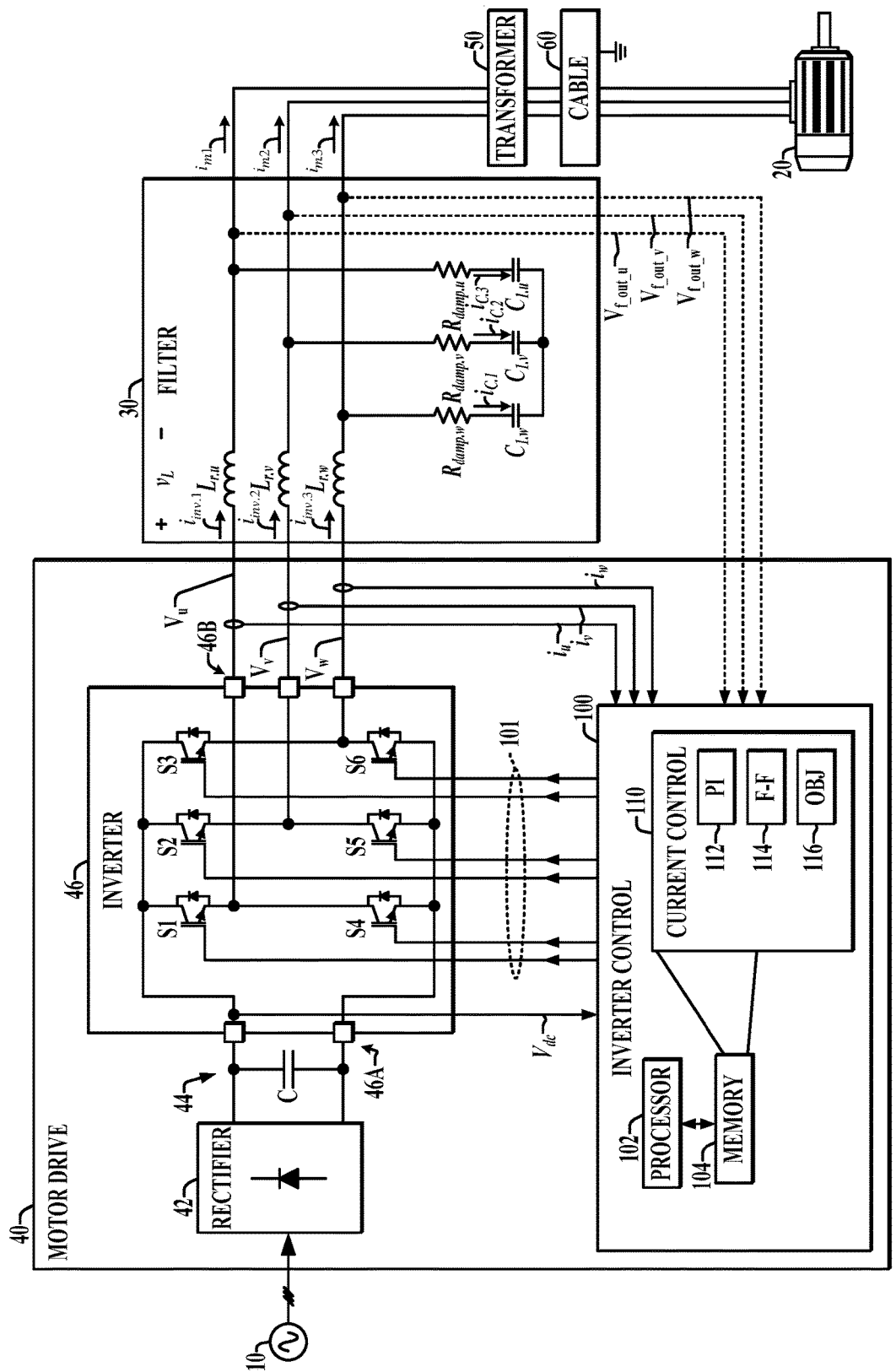
FIG. 1 is a schematic diagram of a motor drive power conversion system with an inverter driving a motor load through an output filter and a transformer.

Referring now to the figures, several embodiments or implementations are hereinafter described in conjunction with the drawings, wherein like reference numerals are used to refer to like elements throughout, and wherein the various features are not necessarily drawn to scale. FIG. 1 shows an example motor drive power conversion system 40 with an inverter 46 to drive an output load, such as a motor 20 through an intervening filter 30, referred to herein as an output filter or a sine wave filter, and a cable 60. In certain implementations, as shown in FIG. 1, a transformer 50 can be connected between the output filter 30 and the driven motor load 20. The inverter 46 generates provides AC output power to a load, such as a single or multi-phase AC motor 20. In one example, the inverter 46 is a Pulse width modulated (PWM) output inverter that provides output currents and voltages that include a number of pulses. Accordingly, output filters 30, such as sine wave filters are sometimes employed between the inverter output and the driven load to reduce the high frequency content caused by pulse width modulation of the inverter switches. The presence of the output filter between the power conversion system and the load makes accurate control of the voltages and currents provided to the load more difficult, as the power delivered to the load is different from that delivered to the input of the filter. The output inverter stage 46 may be controlled according to feedback signals measured at the inverter output terminals, but these feedback values may not represent the currents or voltages ultimately provided to the motor load 20. Feedback sensors can be provided at the load itself for direct measurement of the load parameters, but this increases system cost, and may not be possible in all applications.

Sensorless motor drives are used in a variety of applications, particularly where providing position and/or speed sensors directly at a motor load is difficult or impractical. In certain applications, a step-up transformer is used to boost the motor drive output voltage, allowing use of a low-voltage drive to power a medium voltage induction or permanent magnet synchronous motor, and/or to reduce FR losses and facilitate use of a smaller diameter cable wire for long cable runs between the motor drive and the driven motor. Certain applications also employ output filters between the motor drive inverter output and the transformer primary in order to suppress reflected wave voltage spikes associated with pulse width modulated (PWM) variable frequency drives. Use of sensorless voltage-frequency control techniques, however, may lead to problems, particularly where a transformer and/or sine wave filter is connected between the motor drive and the motor load. Conventional sensorless field-oriented-control (FOC) or other open loop speed control techniques have thus been found generally unsuitable for low-speed motor drive operation where output filters and transformers are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, the driven motor may be unable to successfully start from a stopped condition due to unstable motor speed or motor current oscillations.

Disclosed embodiments provide power conversion systems 40 and inverter control methods and controller apparatus 100 to drive a motor load 20 through an intervening filter 30, which can also be used in combination with a transformer 50 and a potentially lengthy cable 60 coupled between the filter output and the driven motor load 20. FIG. 1 shows a motor drive power conversion system 40 with an inverter 46 and an inverter controller 100 configured to control current of a driven motor load 20 based on sensed or computed inverter output current signals or values $i_u$, $i_v$, $i_w$ representing output currents flowing at an AC output 46B of the inverter 46. In certain embodiments, the controller 100 operates according to sensed or estimated output current values representing the motor phase currents $i_{m.1}$, $i_{m.2}$, $i_{m.3}$ although not a strict requirement of all implementations. The controller 100 in general can use any suitable combination of measured (i.e., sensed), computed and/or estimated feedback values representing various currents and/or voltages in the system. The controller 100 in certain examples is configured to compensate for the presence of the output filter 30, transformer 50 and cable 60 connected between the motor drive output 46B and the driven motor 20. In particular, the inverter controller 100 includes a processor 102 and an associated electronic memory 104 which stores one or more plant amplitude versus frequency transfer functions employed in an object-based control algorithm implemented by the processor 102 in order to facilitate sensorless motor control with compensation for filter capacitor currents is flowing in capacitor components $C_1$ of the filter 30.

Figure 2:
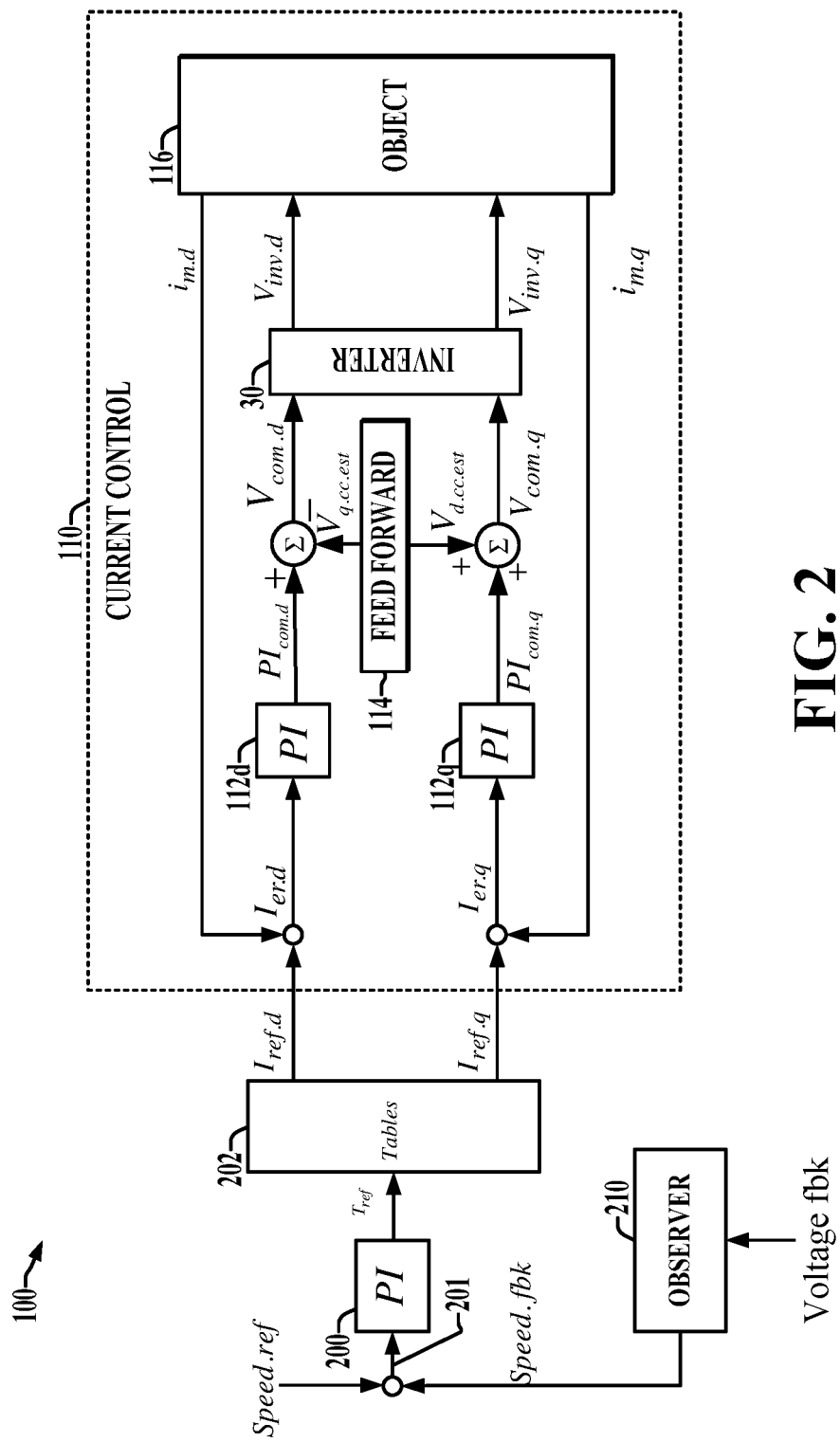
FIG. 2 is a schematic diagram of motor control and motor speed estimation components of the motor controller in FIG. 1.

Referring to FIGS. 1-4, the inverter controller 100 in FIGS. 1 and 2 is a processor-based system in which a processor 102 executes program instructions stored in an electronic memory 104, including a control program component 110 that, when executed, causes the processor 102 to implement a current regulator component 112, a cross-coupled feedforward component 114, and a cross-coupled object component 116. In the illustrated examples, the current controller 110 implements a control algorithm or control program using various signals and/or values, collectively referred to herein as values. Moreover, the processor 102 implements the current control program 110 using various multiphase signals and dual value reference frame values, illustrated and described hereinafter as d and q-axis values. As used herein, a dual value reference frame set of two values is referred to in certain cases as a value. The current control program 110 in certain examples includes various conversions between three phase values and d, q reference frame values. For example, d and q-axis control output values are referred to as $V_{com.d,q}$, which includes a d-axis value $V_{com.d}$, and a q-axis value $V_{com.q}$. In certain examples, the controller 100 provides inverter switching control signals 101 to control the inverter 46 according to d and q-axis control output values (e.g., $V_{com.d,q}$ as shown in FIG. 2). The current regulator component 112 in one example computes a command value $PI_{com.d,q}$ according to a current reference value $I_{ref.d,q}$ and a motor current feedback value $i_{m.d,q}$. The cross-coupled feedforward component 114 is implemented by the processor 102 in order to compensate the command value $PI_{com.d,q}$ by an estimated cross-coupled voltage value $V_{q,d.cc.est}$ to compute the control output value $V_{com.d,q}$, and the cross-coupled object component 116 is executed by the processor 102 to compute the motor current feedback value $i_{m.d,q}$ according to a voltage value (e.g., $V_{inv.d,q}$, $V_{out\Sigma.d,q}$ described further below) using a plant transfer function 1402 parentheses e.g., FIGS. 14-18, 20 and 21 below) that represents the output filter 30, the transformer 50, the cable 60 and the motor load 20. The controller 100 in certain examples provides the inverter switching control signals 101 to control the inverter 46 according to the control output value $V_{com.d,q}$.

In operation, the motor drive 40 receives single or multiphase AC input power from a power source 10 and converts this to a DC bus voltage using a rectifier 42 which provides a DC output voltage to a DC link circuit 44 having a capacitor C. The rectifier 42 can be a passive rectifier including one or more diode rectifier components, or may be an active front end (AFE) system with one or more rectifier switching devices (e.g., IGBTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted. The DC link circuit 44 may include a single capacitor C or multiple capacitors connected in any suitable series, parallel and/or series/parallel configuration to provide a DC link capacitance across inverter input terminals 46A. In addition, while the illustrated motor drive 40 is a voltage source converter configuration including one or more capacitive storage elements in the DC link circuit 44, the various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The DC input 46A of the inverter 46 includes first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by the inverter switching control signals 101 provided by the controller 100 to convert DC electrical power received at the DC input 46A to provide AC electrical output power as inverter output voltages $V_u$, $V_v$, and $V_w$ and inverter output currents $i_u$, $i_v$, and $i_w$ at the AC inverter output 46B. The filter circuit 30 receives the AC output from the inverter 46 of the motor drive 40. Although illustrated in FIG. 4 as driving a permanent magnet synchronous motor 20, the motor drive 40 can be employed in connection with other types of AC motor loads 20 and/or other forms of power converters to drive non-motor loads 20 using an output inverter 46. One or more feedback signals or values may be provided from the motor 20 itself, including a motor (e.g., rotor) position or angle signal and a motor speed or velocity signal, although not a strict requirement of all embodiments of the present disclosure. The concepts of the present disclosure advantageously facilitate the sensorless speed estimation by the inverter controller 100, and thus direct feedback from the driven motor load 20 is not required in all implementations. In this regard, the motor drive 40 in certain embodiments implements a motor speed and/or position and/or torque control scheme in which the inverter controller 100 selectively provides the switching control signals 101 in a closed and/or open-loop fashion according to one or more setpoint values such as a motor speed setpoint, which can be a signal or value generated by the controller 100, or a fixed setpoint value, or such setpoint value can be received from an external system (not shown). In practice, the motor drive 40 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the processor 102.

The inverter 46 of the motor drive 40 is connected to the load 20 through the intervening filter circuit 30. In the illustrated example of FIG. 1, the filter 30 is an "L-C" configuration in which each of the power converter output lines is connected to the motor through a series-connected filter inductor $L_r$ ($L_{r,u}$, $L_{r,v}$ and $L_{r,w}$ in the illustrated example), with a corresponding filter capacitor $C_1$ connected between the corresponding motor line and a common connection point (a neutral of a Y-connected set of filter capacitors $C_{1,u}$, $C_{1,v}$ and $C_{1,w}$ in the illustrated example). In the example of FIG. 1, moreover, the damping resistors $R_{damp.u}$, $R_{damp.v}$ and $R_{damp.w}$ are connected in series with the filter capacitors $C_1$. The damping resistors can be omitted in certain embodiments. Other implementations are possible in which the filter capacitors $C_1$ are connected in a "Delta" configuration. In the illustrated (Y-connected) configuration, the filter circuit neutral point can be optionally connected to a circuit ground or other, connection point associated with the motor drive 40, although not a strict requirement of the present disclosure. The disclosed apparatus and techniques can be employed in connection with other forms and types of filter circuits 30, including without limitation L-C-L circuits, etc., of which behavior can typically be modeled as a second order system or filters which contain multiple inductive, capacitive, and resistive elements as further illustrated and described below.

The output of the filter circuit 30 provides motor phase currents $i_{m.1}$, $i_{m.2}$, $i_{m.3}$ to control the motor load 20, whereas the filter capacitor currents $i_C$ flow in the filter capacitors $C_1$ and non-zero voltages $v_L$ (i.e., filter voltages) may develop across one or more of the filter inductors $L_r$, whereby simple closed-loop control based on measured inverter output current signals or values $i_u$, $i_v$, $i_w$ may result in less than optimal operation of the driven load 20. At the same time, however, directly measuring the motor currents $i_{m.1}$, $i_{m.2}$, $i_{m.3}$ and/or motor voltages would require additional hardware and cabling, which may not be economically feasible or technically possible in certain applications. Nevertheless, for those cases where motor currents and/or motor voltages, such as $V_u$, $V_v$, $V_w$, $V_{f\_out\_u}$, $V_{f\_out\_v}$, and $V_{f\_out\_w}$ in FIG. 1, are measured, those signals can be used to enhance or replace the inverter current and/or voltage signals in the computation of the compensation signals. Certain embodiments of the inverter controller 100, however, advantageously provide steady-state cross-coupled feedforward compensation and object-based control using a plant transfer function 1402 independent of the voltage feedback information. As seen in FIG. 1, moreover, the illustrated drive 40 may also include one or more current sensors configured to measure, sense, or otherwise detect at least one inverter output feedback signal or value (e.g., output currents $i_u$, $i_v$, $i_w$) which represent the output current at the AC output 46B of the inverter 46. The inverter controller 100 thus accommodates the presence of the filter circuit 30 (e.g., and any optionally included transformer 50 and potentially lengthy motor cable 60) between the motor drive output 46B and the driven motor load 20, without requiring addition of external sensors to sense the actual conditions at the motor load 20.

The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements, such as one or more processors 102, and may be implemented as a set of subcomponents or objects including computer executable instructions stored in the electronic memory 104 for operation using computer readable data executing on one or more hardware platforms such as one or more computers including one or more processors, data stores, memory, etc. The components of the controller 100 may be executed on the same computer processor or in distributed fashion in two or more processing components that are operatively coupled with one another to provide the functionality and operation described herein.

Figure 3:
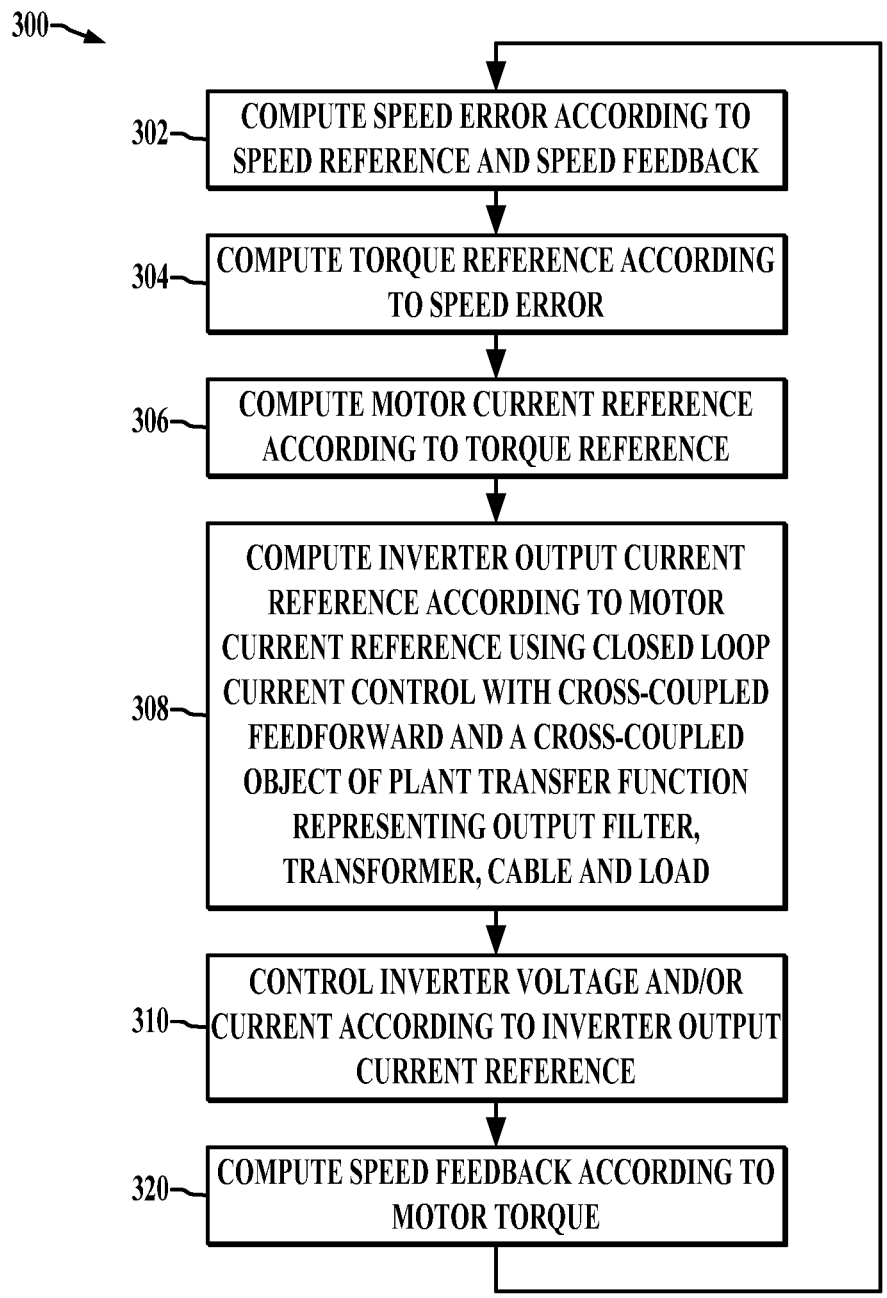
FIG. 3 is a flow diagram illustrating a method to control an inverter to drive a motor load through an intervening filter in the apparatus of FIGS. 1 and 2.
Figure 4:
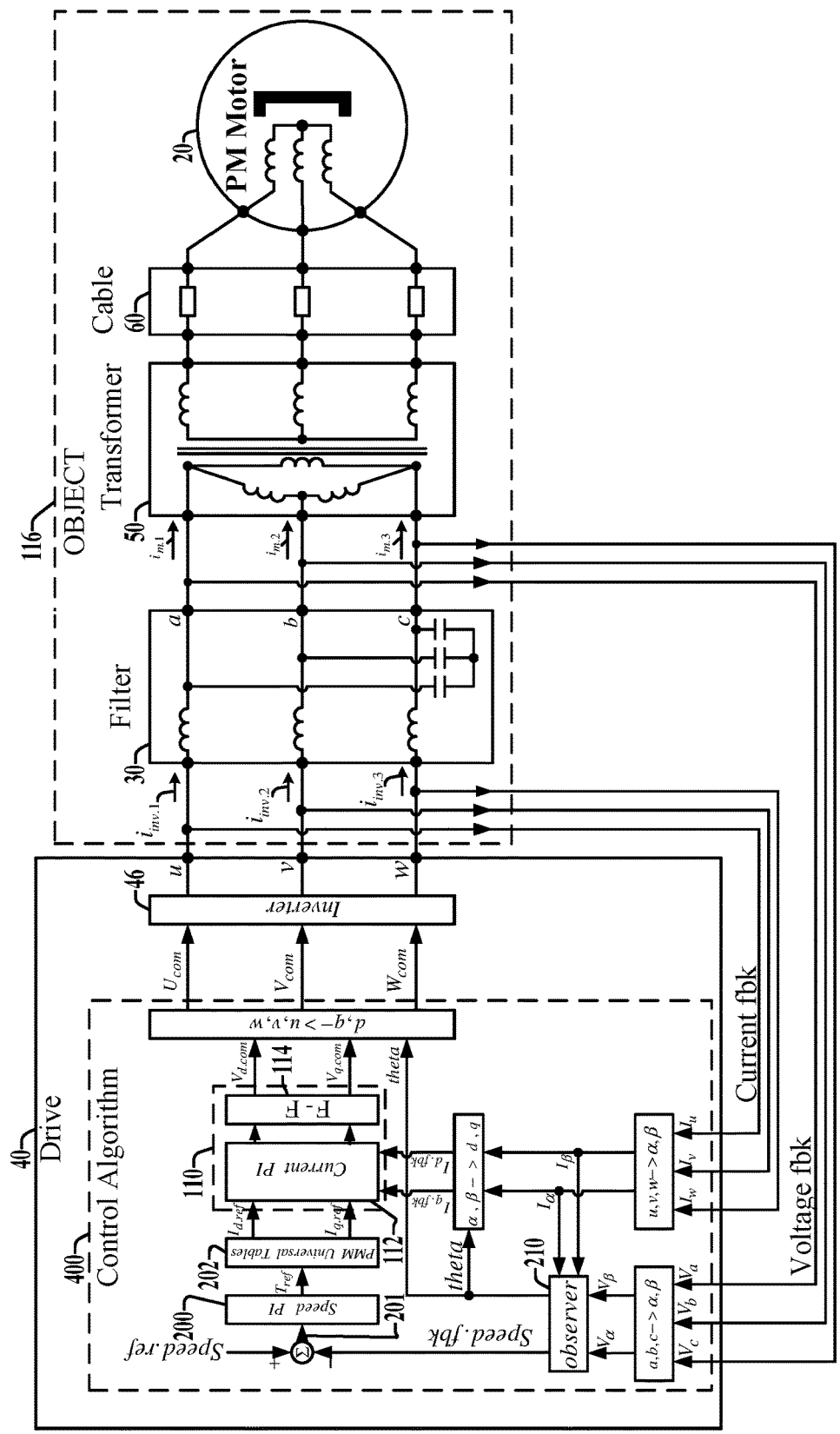
FIGS. 4-21 are schematic diagrams of an example three-phase sine wave output filter with two reactor windings between the inverter and the transformer of FIG. 1.

Referring also to FIGS. 2 and 3, FIG. 2 illustrates filter transfer functions, motor control and motor speed estimation components of the motor controller 100 in the motor drive 40 of FIG. 1, and FIG. 3 illustrates a process or method 300 of operating the motor drive inverter 46 to drive a motor load 20 through an intervening filter 30, which can be implemented in the controller 100. The controller 100 implements a closed loop control algorithm including one or more proportional-integral (PI) control components in order to control the driven load 20. FIG. 2 shows the mathematical implementation of the controlled process in the controller 100. In one possible implementation, the processor 102 implements the control scheme of FIG. 2 by executing program instructions stored in the memory 104, as described hereinafter in conjunction with the process 300 of FIG. 3. At 302 in FIG. 3, the controller 100 computes a speed error value 201 according to a speed reference value Speed.ref and a speed feedback value Speed.fbk, for example, by subtracting the feedback value from the reference value. The feedback value can be obtained from any suitable source, including actual speed sensors (not shown) or from a speed observer 210 as shown in FIG. 2. In this example, the controller 100 implements a first proportional-integral (PI) control component 200 that receives the resulting speed error signal 201 and operates according to known proportional-integral control operation to compute a torque reference value $T_{ref}$ according to the speed error value 201 at 304 in FIG. 3. At 306, the controller 100 uses one or more lookup tables 202 or solves one or more parametric equations (not shown) to compute one or more motor current reference values. In the example of FIG. 2, the controller 100 computes d and q axis motor current reference values $I_{ref.d}$ and $I_{ref.q}$ according to the torque reference value $T_{ref}$, where this computation in certain examples includes indexing a lookup table 202. In certain examples, the controller 100 scales the d and q axis motor current reference values $I_{ref.d}$ and $I_{ref.q}$ according to a turns ratio of any included output transformer 50.

At 308, the controller 100 computes a d, q inverter output current reference according to motor current reference values $I_{ref.d}$ and $I_{ref.q}$ using a closed loop current control with cross-coupled feedforward component 1114 and a cross-coupled object component 116 using a plant transfer function 1402 that represents the output filter 30, the transformer 50, cable 60 and the motor load 20. In one example, the first transfer function 1402 represents the output current to input voltage amplitude vs. frequency behavior, for example, to incorporate parameter values representing impedance components (e.g., resistances, inductances, and/or capacitance) of the output filter 30, the transformer 50, the cable 60 and the motor load 20. In certain embodiments, moreover, the parameter values of the transfer function 1402 are configurable to adapt the power conversion system 40 for different output filters, transformers, cables and different motor loads 20. For example, the motor drive 40 and the inverter controller 100 are programmable in certain implementations to accept programming values for the parameters of a given filter 30, transformer 50, cable 60 and/or motor load 20. This allows a user to adapt the motor drive 40 for use in combination with a variety of different filter and motor combinations.

At 310, the controller 100 provides the inverter switching control signals 102 to control the inverter 46 according to the inverter output current reference value(s) $I_{ref.d,q}$, and the controller 100 computes or estimates the speed feedback value Speed.fbk according to any suitable measured or inferred value, such as inverter currents and voltages in one example. In another example, the controller uses sensor information for the speed feedback. In this manner, the current and voltage control of the driven motor 20 is compensated according to the transfer function 1402 that characterizes the components of the system including the filter 30, the transformer 50, the cable 60 and the driven motor load 20. Moreover, the controller 100 in certain embodiments implements sensorless speed control according to the estimated speed feedback value Speed.fbk without requiring speed feedback. Without wishing to be tied to any particular theory, the steady state current control implemented by the controller 100 can be advantageously employed to mitigate or avoid unwanted output oscillation in the motor speed and/or torque for sensorless ESP and other applications, thereby facilitating higher frequency operation of the driven motor load 20. This is particularly beneficial for deep well pumping applications where pumping speeds are important and the motor cable 60 may be quite lengthy, and a transformer 50 is beneficial to boost up the voltage of the output signal provided by the inverter 46 in order to drive a motor load 20 at the end of a lengthy cable 60.

In certain embodiments, the controller 100 implements closed loop current regulation by generating voltage commands for operating the inverter 46. Further details are described below in connection with two example embodiments shown in FIGS. 20 and 21. The current regulator 112 component in FIG. 2 computes a d-axis command value $PI_{com.d}$ according to a d-axis current reference value $I_{ref.d}$ and a d-axis motor current feedback value $i_{m.d}$, and computes a q-axis command value $PI_{com.q}$ according to a q-axis current reference value $I_{ref.q}$ and a q-axis motor current feedback value $i_{m.q}$. In the example of FIG. 2, the controller 100 is operative to control the inverter 46 according to the inverter output current reference value(s) $I_{ref.d,q}$ by computing an inverter output voltage control value command value $PI_{com.d,q}$, for example, d and q values command value $PI_{com.d}$ and command value $PI_{com.q}$ computed using d and q-axis voltage control PI components 112d and 112q, respectively, according to the inverter output current error value(s) $I_{er.d,q}$. The cross-coupled feedforward component 114 compensates the d-axis command value $PI_{com.d}$ by subtracting an estimated q-axis voltage value $V_{q.cc.est}$ from the d-axis command value $PI_{com.d}$ to compute a d-axis control output value $V_{com.d}$, and compensates the q-axis command value $PI_{com.q}$ by adding an estimated d-axis voltage value $V_{d.cc.est}$ to the q-axis command value $PI_{com.q}$ to compute a q-axis control output value $V_{com.q}$. In certain examples, the cross-coupled feedforward component 114 computes the estimated q-axis voltage value $V_{q.cc.est}$ according to an estimated q-axis motor back EMF value $E_{m.q.est}$ (e.g., FIGS. 20 and 21 below). The controller 100 provides the inverter switching control signals 101 at 310 in this example to control the inverter 46 according to the d and q-axis control output values $V_{com.d,q}$, and the object component 116 provides cross-coupling of certain d and q-axis values using a transfer function (1402 below) to provide the motor current feedback values $i_{m.d}$ and $i_{m.q}$ to the controller components 112d and 112q, respectively. In certain example, moreover, the object component 116 computes the d-axis motor voltage value $V_{d.cc}$ according to a q-axis motor back EMF value $E_{m.q}$ (e.g., FIGS. 20 and 21 below).

Figure 5:
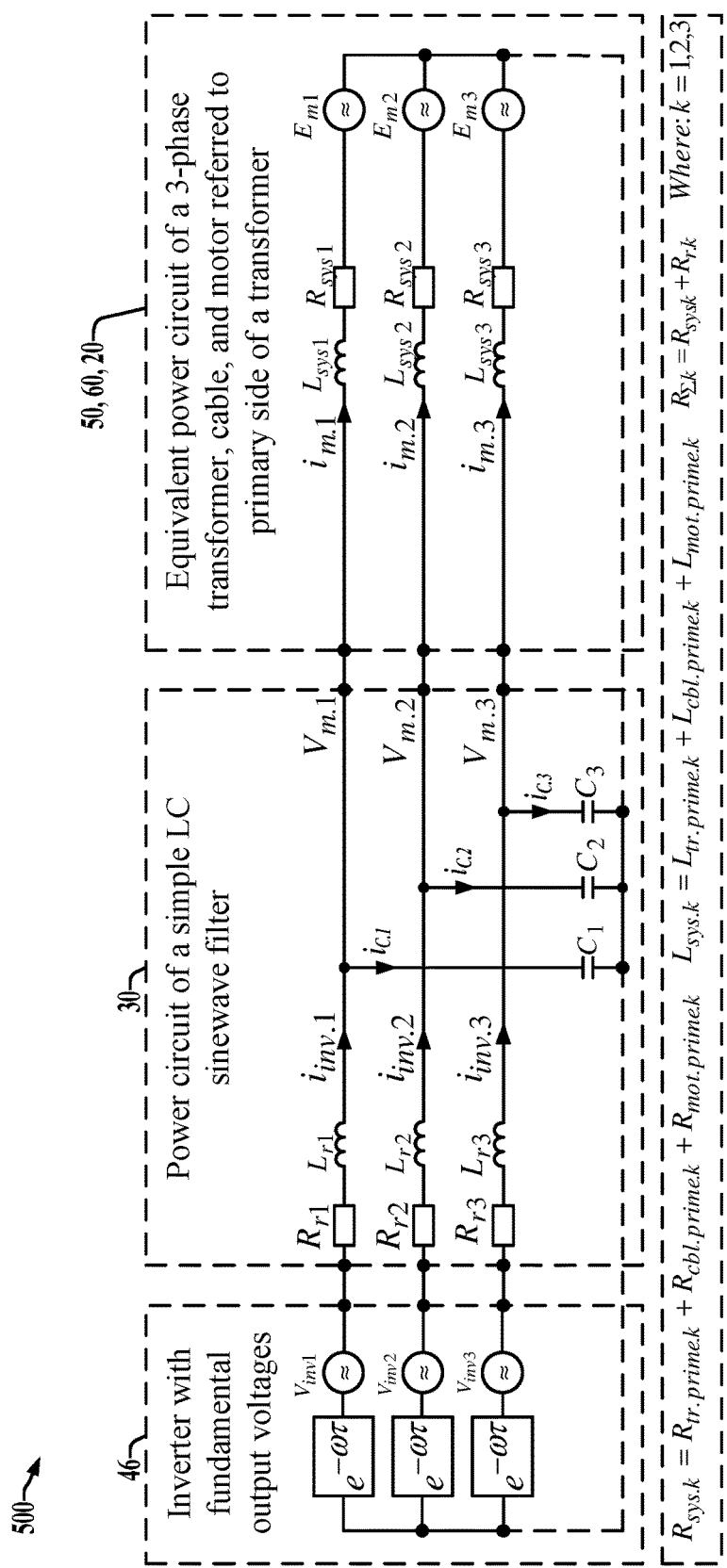

Referring now to FIGS. 4-21, FIG. 4 shows a system structure for oil pump applications with closed-loop control which can be implemented by the controller 100 in FIGS. 1 and 2 in certain examples. FIG. 5 illustrates an object equivalent electrical circuit 500 to represent the system of FIGS. 1 and 2 and FIGS. 6-21 illustrate development of example feedforward components 114 and object components 116 shown in FIGS. 20 and 21 that can be implemented by the processor 102 in the closed loop current control scheme 110 by the controller 100. In order to further illustrate the operation of the components 112, 114 and 116 in certain examples, the following set of equations (1)-(4) describe voltage and current conditions in an example sinewave filter 30 for a balanced three-phase system:

$$L_r \frac{di_{inv.k}}{dt} = V_{inv.k} - V_{m.k} - R_r \cdot i_{inv.k} \quad (1)$$

Where: $k = 1, 2, 3$ $$C \frac{dV_{m.k}}{dt} = i_{c.k} \quad (2)$$

$$L_{sys} \frac{di_{m.k}}{dt} = V_{m.k} - E_{m.k} - R_{sys} \cdot i_{m.k} \quad (3)$$

$$i_{inv.k} - i_{c.k} = i_{m.k} \quad (4)$$

The transformation of variables between two and three phase system is given by the following equations (5) and (6):

$$X_\alpha = \frac{1}{3}(2X_1 - X_2 - X_3) \quad (5)$$

$$X_\beta = \frac{1}{\sqrt{3}}(X_3 - X_2), \quad (6)$$

where $X_l \in \{V_l, E_l, i_l, i_{cl}\}$ $l=\alpha, \beta$ (Two-phase system variables) and $X_k \in \{V_k, E_k, i_k, i_{ck}\}$ $k=1,2,3$ (Three-phase system variables). The above stationary reference frame variables can be transformed into a synchronous reference frame using the following equations (7) and (8):

$$\overline{X}_{\alpha\beta} = X_\alpha - jX_\beta \quad (7)$$

$$\overline{X}_{q,d} = \overline{X}_{\alpha\beta} e^{-j\theta} \quad \theta = \int \omega dt \quad \omega = 2\pi f \quad (8)$$

where: $\overline{X}_{\alpha\beta}$ is a complex vector (with components "$X_\alpha$" and "$X_\beta$") rotating counterclockwise, $\overline{X}_{q,d}$ is a synchronous frame representation of $\overline{X}_{\alpha\beta}$, $f$ is a fundamental frequency (Hz). After applying three-to-two reference frame transformation (e.g., equations (4)-(6) above), equations (1)-(3) can be rewritten in a vector form as follows:

$$L_r \frac{d\bar{i}_{inv.\alpha,\beta}}{dt} = \overline{V}_{inv.\alpha,\beta} - \overline{V}_{m.\alpha,\beta} - R_r \cdot \bar{i}_{inv.\alpha,\beta} \quad (9)$$

$$C \frac{d\overline{V}_{m.\alpha,\beta}}{dt} = \bar{i}_{c.\alpha,\beta} = \quad (10)$$

$$L_{sys} \frac{d\bar{i}_{m.\alpha,\beta}}{dt} = \overline{V}_{m.\alpha,\beta} - \overline{E}_{m.\alpha,\beta} - R_{sys} \cdot \bar{i}_{m.\alpha,\beta} \quad (11)$$

$$\bar{i}_{inv.\alpha,\beta} - \bar{i}_{c.\alpha,\beta} = \bar{i}_{m.\alpha,\beta} \quad (12)$$

Using the synchronous reference frame transformation of equation (8) "α,β" can be expressed as a function of a "q, d" as per the following equation (13):

$$\overline{X}_{\alpha\beta} = \frac{\overline{X}_{q,d}}{e^{-j\omega t}} = \overline{X}_{q,d} e^{j\omega t} \quad (13)$$

Using equation (13), equations (9)-(12) can be rewritten as follows:

$$L_r \frac{d(\bar{i}_{inv.q,d} \cdot e^{j\omega t})}{dt} = \overline{V}_{inv.q,d} \cdot e^{j\omega t} - \overline{V}_{m.q,d} \cdot e^{j\omega t} - R_r \cdot \bar{i}_{inv.q,d} \cdot e^{j\omega t} \quad (14)$$

$$C \frac{d(\overline{V}_{m.q,d} \cdot e^{j\omega t})}{dt} = \bar{i}_{c.q,d} \cdot e^{j\omega t} \quad (15)$$

$$L_{sys} \frac{d(\bar{i}_{m.q,d} \cdot e^{j\omega t})}{dt} = \overline{V}_{m.q,d} \cdot e^{j\omega t} - \overline{E}_{m.q,d} \cdot e^{j\omega t} - R_{sys} \cdot \bar{i}_{m.q,d} \cdot e^{j\omega t} \quad (16)$$

$$\bar{i}_{inv.q,d} \cdot e^{j\omega t} - \bar{i}_{c.q,d} \cdot e^{j\omega t} = \bar{i}_{m.q,d} \cdot e^{j\omega t} \quad (17)$$

The corresponding deferential can be rewritten according to the following equation (18):

$$\frac{d(\overline{X}_{q,d} \cdot e^{j\omega t})}{dt} = \frac{d\overline{X}_{q,d}}{dt} e^{j\omega t} + j\omega \overline{X}_{q,d} e^{j\omega t} \quad (18)$$

Equations (14)-(17) can be rewritten by applying equation (18) as follows:

$$L_r \frac{d\bar{i}_{inv.q,d}}{dt} e^{j\omega t} + j\omega L_r \bar{i}_{inv.q,d} e^{j\omega} = \\ \overline{V}_{inv.q,d} \cdot e^{j\omega t} - \overline{V}_{m.q,d} \cdot e^{j\omega t} - R_r \cdot \bar{i}_{inv.q,d} \cdot e^{j\omega t} \quad (19)$$

$$C \frac{d\overline{V}_{m.q,d}}{dt} e^{j\omega t} + j\omega C \overline{V}_{m.q,d} e^{j\omega t} = \bar{i}_{c.q,d} e^{j\omega t} \quad (20)$$

$$L_{sys} \frac{d\bar{i}_{m.q,d}}{dt} e^{j\omega t} + j\omega L_{sys} \bar{i}_{m.q,d} e^{j\omega} = \\ \overline{V}_{m.q,d} \cdot e^{j\omega t} - \overline{E}_{m.q,d} \cdot e^{j\omega t} - R_{sys} \cdot \bar{i}_{m.q,d} \cdot e^{j\omega t} \quad (21)$$

$$\bar{i}_{inv.q,d} \cdot e^{j\omega t} - \bar{i}_{c.q,d} \cdot e^{j\omega t} = \bar{i}_{m.q,d} \cdot e^{j\omega t} \quad (22)$$

Or, after dividing left and right parts of equations (19)-(22) by $e^{j\omega}$ then:

$$L_r \frac{d\bar{i}_{inv.q,d}}{dt} + j\omega L_r \bar{i}_{inv.q,d} = \overline{V}_{inv.q,d} - \overline{V}_{m.q,d} R_r \cdot \bar{i}_{inv.q,d} \quad (23)$$

$$C \frac{d\overline{V}_{m.q,d}}{dt} + j\omega C \overline{V}_{m.q,d} = \bar{i}_{c.q,d} \quad (24)$$

$$L_{sys}\frac{d\bar{i}_{m.q,d}}{dt} + j\omega L_{sys}\bar{i}_{m.q,d} = \bar{V}_{m.q,d} - \bar{E}_{m.q,d} - R_{sys}\cdot\bar{i}_{m.q,d} \quad (25)$$

$$\bar{i}_{inv.q,d} - \bar{i}_{c.q,d} = \bar{i}_{m.q,d} \quad (26)$$

After some manipulation, where p designates a time derivative d/dt, the following can be derived:

$$R_r\left(1 + p\frac{L_r}{R_r}\right)\cdot\bar{i}_{inv.q,d} = \bar{V}_{inv.q,d} - \bar{V}_{m.q,d} - j\omega L_r\bar{i}_{inv.q,d} \quad (27)$$

$$pC\bar{V}_{m.q,d} + j\omega C\bar{V}_{m.q,d} = \bar{i}_{c.q,d} \quad (28)$$

$$R_{sys}\left(1 + p\frac{L_{sys}}{R_{sys}}\right)\cdot\bar{i}'_{m.q,d} = \bar{V}_{m.q,d} - \bar{E}_{m.q,d} - j\omega L_{sys}\bar{i}_{m.q,d} \quad (29)$$

$$\bar{i}_{inv.q,d} - \bar{i}_{c.q,d} = \bar{i}_{m.q,d} \quad (30)$$

Or, finally:

$$\bar{i}_{inv.q,d} = \frac{1}{R_r\left(1 + p\frac{L_r}{R_r}\right)}\cdot(\bar{V}_{inv.q,d} - \bar{V}_{m.q,d} - j\omega L_r\bar{i}_{inv.q,d}) \quad (31)$$

$$\bar{i}_{c.q,d} = pC\bar{V}_{m.q,d} + j\omega C\bar{V}_{m.q,d} \quad (32)$$

$$\bar{i}_{m.q,d} = \frac{1}{R_{sys}\left(1 + p\frac{L_{sys}}{R_{sys}}\right)}\cdot(\bar{V}_{m.q,d} - \bar{E}_{m.q,d} - j\omega L_{sys}\bar{i}_{m.q,d}) \quad (33)$$

$$\bar{i}_{c.q,d} = \bar{i}_{inv.q,d} - \bar{i}_{m.q,d} \quad (34)$$

Equation (31) can be rewritten in a scalar using equation (7) as follows:

$$i_{inv.q} - ji_{inv.d} = \frac{1}{R_r\left(1 + p\frac{L_r}{R_r}\right)} \quad (35)$$

Or:

$$i_{inv.q} = \frac{1}{R_r\left(1 + p\frac{L_r}{R_r}\right)}(V_{inv.q} - V_{m.q} - \omega L_r i_{inv.d}) \quad (36)$$

$$i_{inv.d} = \frac{1}{R_r\left(1 + p\frac{L_r}{R_r}\right)}(V_{inv.d} - V_{m.d} + \omega L_r i_{inv.q}) \quad (37)$$

Equation (32) can be rewritten in a scalar form using equation (7) as follows:

$$i_{c.q} - ji_{c.d} = pC V_{m.q} - jpCV_{m.d} + j\omega CV_{m.q} + \omega CV_{m.d} \quad (38)$$

Or:

$$i_{c.q} = pCV_{m.q} + \omega CV_{m.d} \quad (39)$$

$$i_{c.d} = pCV_{m.d} - \omega CV_{m.q} \quad (40)$$

$$V_{m.q} = \frac{1}{pC}[i_{c.q} - \omega CV_{m.d}] \quad (41)$$

$$V_{m.d} = \frac{1}{pC}[i_{c.d} + \omega CV_{m.q}] \quad (42)$$

Equation (33) can be rewritten in a scalar form using equation (7) as follows:

$$i_{m.q} - ji_{m.d} = \frac{1}{R_{sys}\left(1 + p\frac{L_{sys}}{sys}\right)} \quad (43)$$

$$(V_{m.q} - jV_{m.d} - E_{m.q} + jE_{m.d} - j\omega L_{sys}i_{m.q} - \omega L_{sys}i_{m.d})$$

Assuming "$jE_{m.d}=0$", the following applies:

$$i_{m.q} = \frac{1}{R_{sys}\left(1 + p\frac{L_{sys}}{R_{sys}}\right)}(V_{m.q} - E_{m.q} - \omega L_{sys}i_{m.d}) \quad (44)$$

$$i_{m.d} = \frac{1}{R_{sys}\left(1 + p\frac{L_{sys}}{R_{sys}}\right)}(V_{m.d} + \omega L_{sys}i_{inv.q}) \quad (45)$$

Equation (34) can be rewritten in a scalar form using equation (7) as follows:

$$i_{c.q} - ji_{c.d} = i_{inv.q} - ji_{inv.d} - i_{m.q} + ji_{m.d}. \quad (46)$$

$$i_{c.q} = i_{inv.q} - i_{m.q} \quad (47),$$

$$i_{c.d} = i_{inv.d} - i_{m.d} \quad (48)$$

Where: "$i_q$ and $i_d$" are "d-q" representation of currents "$i_1$, $i_2$, and $i_3$" (see FIG. 1).

Based on equations (36), (37), (39)-(42), (44), (45), (47) and (48) the system can be represented as the dynamic block diagram 500 illustrated in FIG. 5. This system includes the control components, the inverter and an object that provides the current feedback to the controller components.

Figure 6:
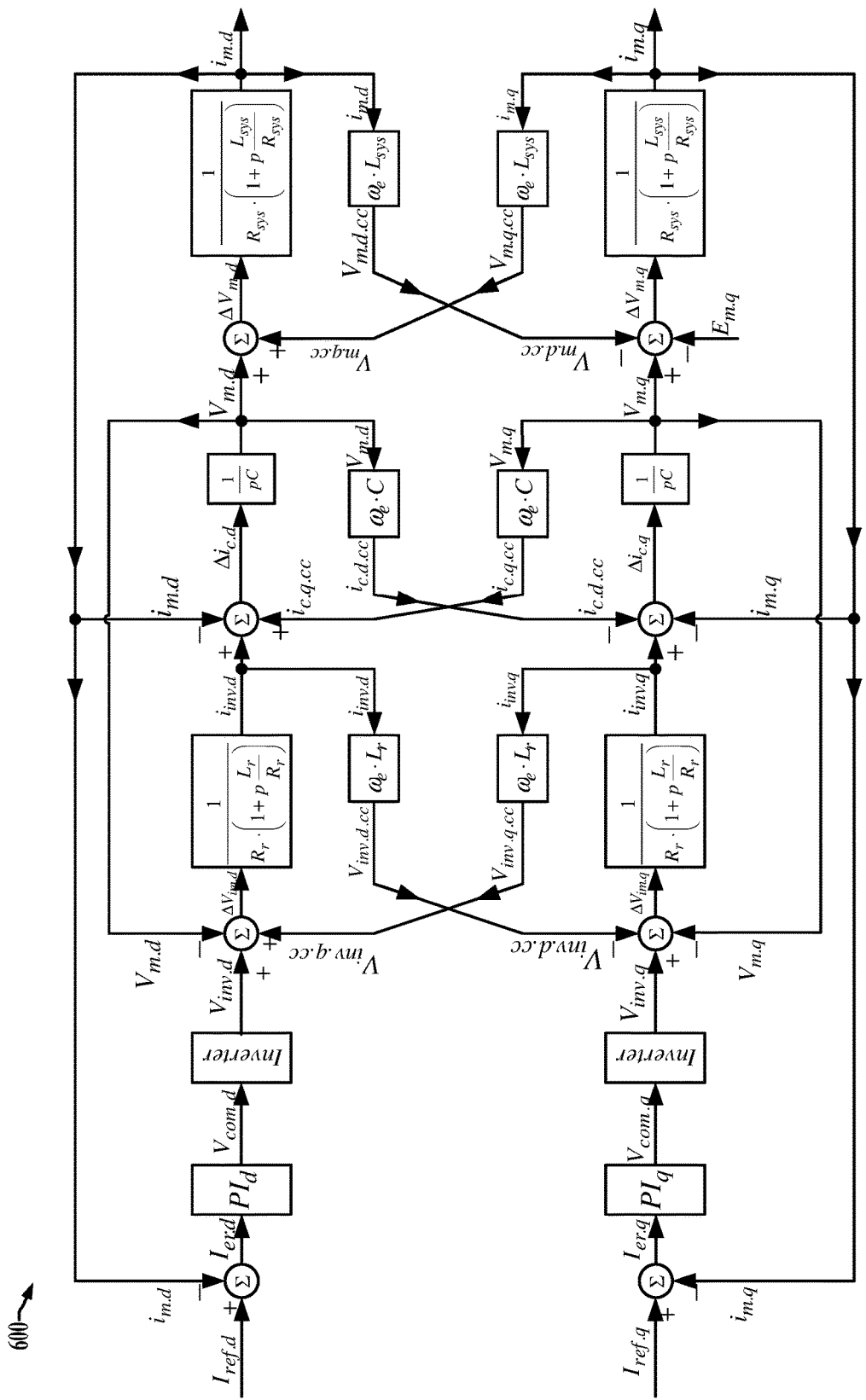
Figure 7:
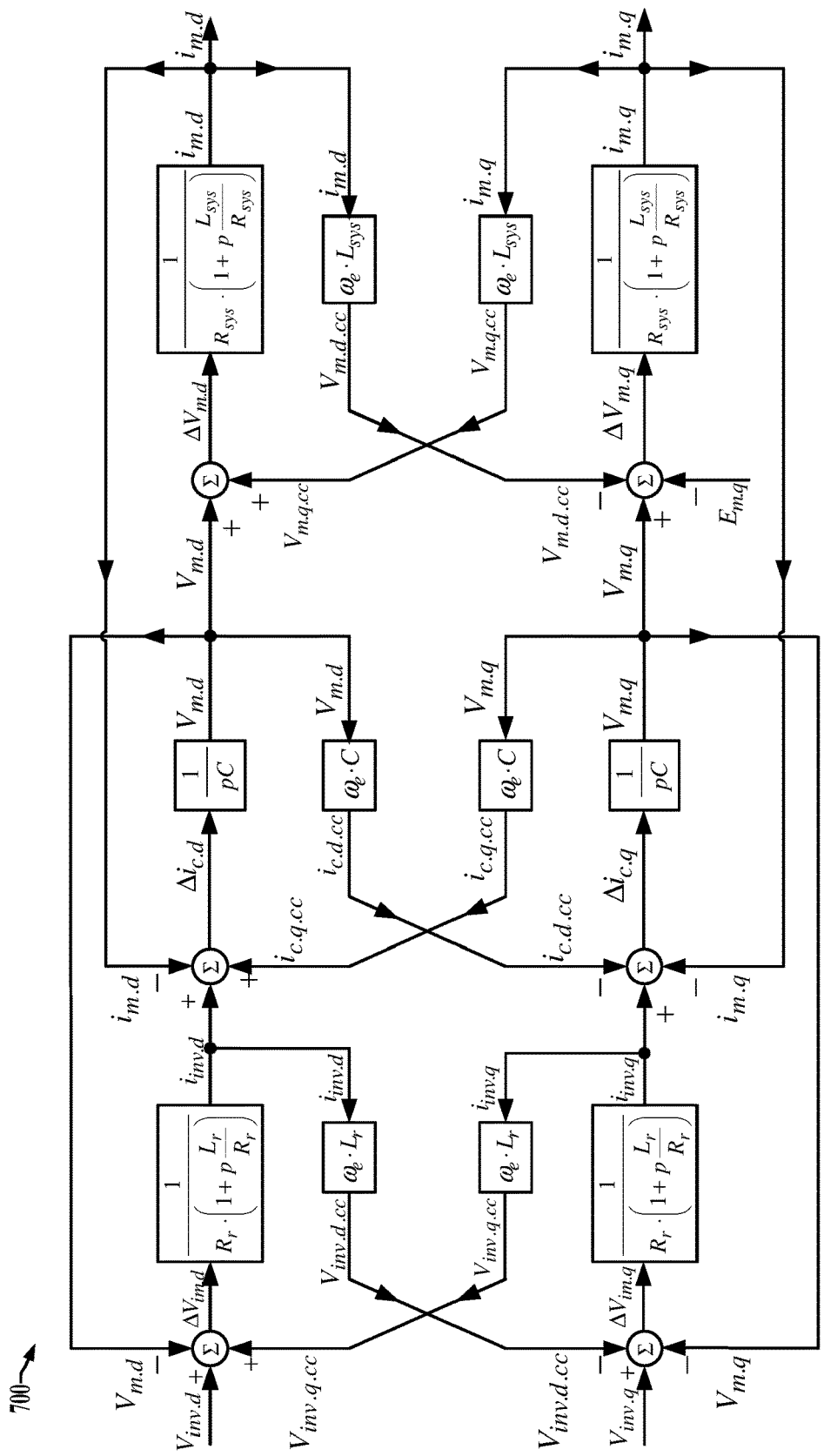
Figure 8:
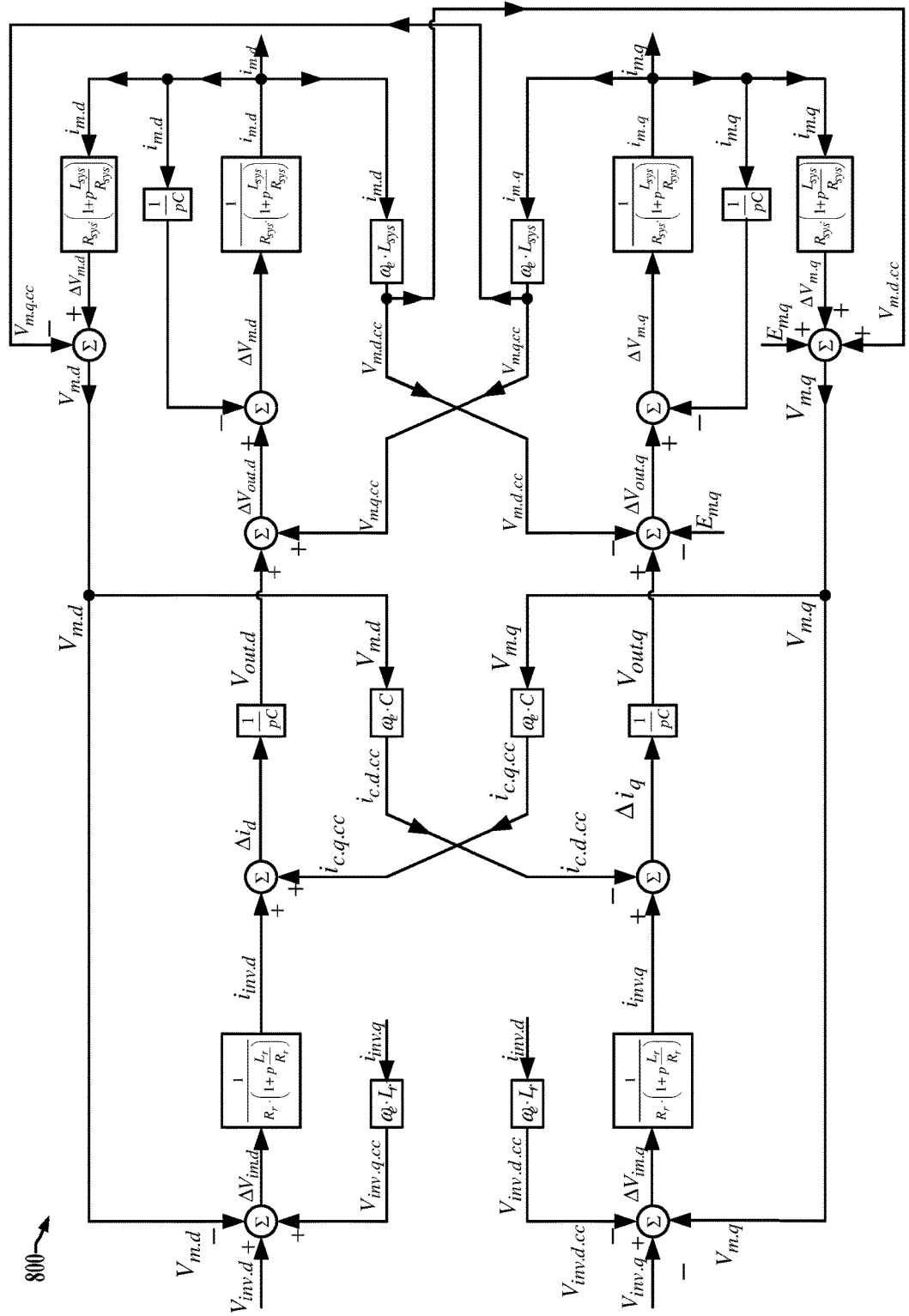

FIG. 6 shows a "d-q" current loops control schematic diagram 600 with an LC sinewave filter, transformer, cable and SPM motor, which can be represented using a calculated motor current value $i_{m.d.q}$ as feedback. A diagram 700 in FIG. 7 shows the system of FIG. 6 with the only object, so FIG. 7 represents the object. In FIG. 7, the object includes two closed current loops and two closed voltage loops ("d" and "q"). These closed loops are overlapping. A diagram 800 in FIG. 8 shows a further simplification to separate these loops, and further simplifications are illustrated in diagrams 900, 1000, 1100, 1200, 1300, 1400, 1500, 1600, 1700, 1800 of FIGS. 9-18, respectively. This development shows a step-by-step block transformation. Initially, the cross-coupling terms can be drawn with inverter currents $i_{inv.d,q}$ separately as in FIG. 8, as the currents are always measurable and available to the controller 100. The following equations can be written as shown in FIG. 7:

$$\Delta V_{m.d} = (i_{inv.d} - i_{m.d} + i_{c.q.cc})\cdot\frac{1}{pC} + V_{m.q.cc} = [ \quad (49)$$

$$(i_{inv.d} + i_{c.q.cc})\cdot\frac{1}{pC} + V_{m.q.cc}] - i_{m.d}\cdot\frac{1}{pC} = \Delta V_{out.d} - i_{m.d}\cdot\frac{1}{pC}.$$

$$V_{m.d} = \Delta V_{m.d} - V_{m.q.cc} = i_{m.d}\cdot R_{sys}\cdot\left(1 + p\frac{L_{sys}}{R_{sys}}\right) - V_{m.q.cc} \quad (50)$$

-continued $$\Delta V_{m.q} = (i_{inv.q} - i_{m.q} - i_{c.d.cc}) \cdot \frac{1}{pC} - V_{m.d.cc} - \quad (51)$$

$$E_{m.q} = \left[(i_{inv.q} - i_{c.d.cc}) \cdot \frac{1}{pC} - V_{m.d.cc} - E_{m.q}\right] - i_{m.q} \cdot \frac{1}{pC} =$$

$$\Delta V_{out.q} - i_{m.q} \cdot \frac{1}{pC}.$$

$$V_{m.q} = \Delta V_{m.q} + V_{m.d.cc} + E_{m.q} = i_{m.q} \cdot R_{sys} \cdot \left(1 + p\frac{L_{sys}}{R_{sys}}\right) + V_{m.d.cc} + E_{m.q} \quad (52)$$

The object can be redrawn as shown in FIG. 8 according to equations (49)-(52) as a first step of the transformation. According to a block diagram transformation law for closed loops in FIG. 8, the following transfer functions can be written:

$$H_{im.d/\Delta Vout.d}(p) = \frac{i_{m.d}(p)}{\Delta V_{out.d}} = \frac{\frac{1}{R_{sys} \cdot \left(1 + p\frac{L_{sys}}{R_{sys}}\right)}}{1 + \frac{1}{R_{sys} \cdot \left(1 + p\frac{L_{sys}}{R_{sys}}\right)} \cdot \frac{1}{pC}} = \quad (53)$$

$$\frac{\frac{1}{R_{sys} \cdot \left(1 + p\frac{L_{sys}}{R_{sys}}\right)}}{\frac{pC \cdot R_{sys} \cdot \left(1 + p\frac{L_{sys}}{R_{sys}}\right) + 1}{pC \cdot R_{sys} \cdot \left(1 + p\frac{L_{sys}}{R_{sys}}\right)}} = \frac{pC}{1 + pCR_{sys} + p^2 CL_{sys}}$$

$$\Delta V_{out.d} = \left[(i_{inv.d} + i_{c.q.cc}) \cdot \frac{1}{pC} + V_{m.q.cc}\right] = \quad (54)$$

$$\frac{1}{pC} \cdot [i_{inv.d} + (i_{c.q.cc} + pC \cdot V_{m.q.cc})]$$

$$H_{im.q/\Delta Vout.q}(p) = \frac{i_{m.q}(p)}{\Delta V_{out.q}} = \frac{\frac{1}{R_{sys} \cdot \left(1 + p\frac{L_{sys}}{R_{sys}}\right)}}{1 + \frac{1}{R_{sys} \cdot \left(1 + p\frac{L_{sys}}{R_{sys}}\right)} \cdot \frac{1}{pC}} = \quad (55)$$

$$\frac{\frac{1}{R_{sys} \cdot \left(1 + p\frac{L_{sys}}{R_{sys}}\right)}}{\frac{pC \cdot R_{sys} \cdot \left(1 + p\frac{L_{sys}}{R_{sys}}\right) + 1}{pC \cdot R_{sys} \cdot \left(1 + p\frac{L_{sys}}{R_{sys}}\right)}} = \frac{pC}{1 + pCR_{sys} + p^2 CL_{sys}}$$

$$\Delta V_{out.q} = \left[(i_{inv.q} - i_{c.q.cc}) \cdot \frac{1}{pC} - V_{m.q.cc} - E_{m.q}\right] = \quad (56)$$

$$\frac{1}{pC} \cdot [i_{inv.d} - pC \cdot E_{m.q} - (i_{c.q.cc} + pC \cdot V_{m.q.cc})]$$

Figure 9:
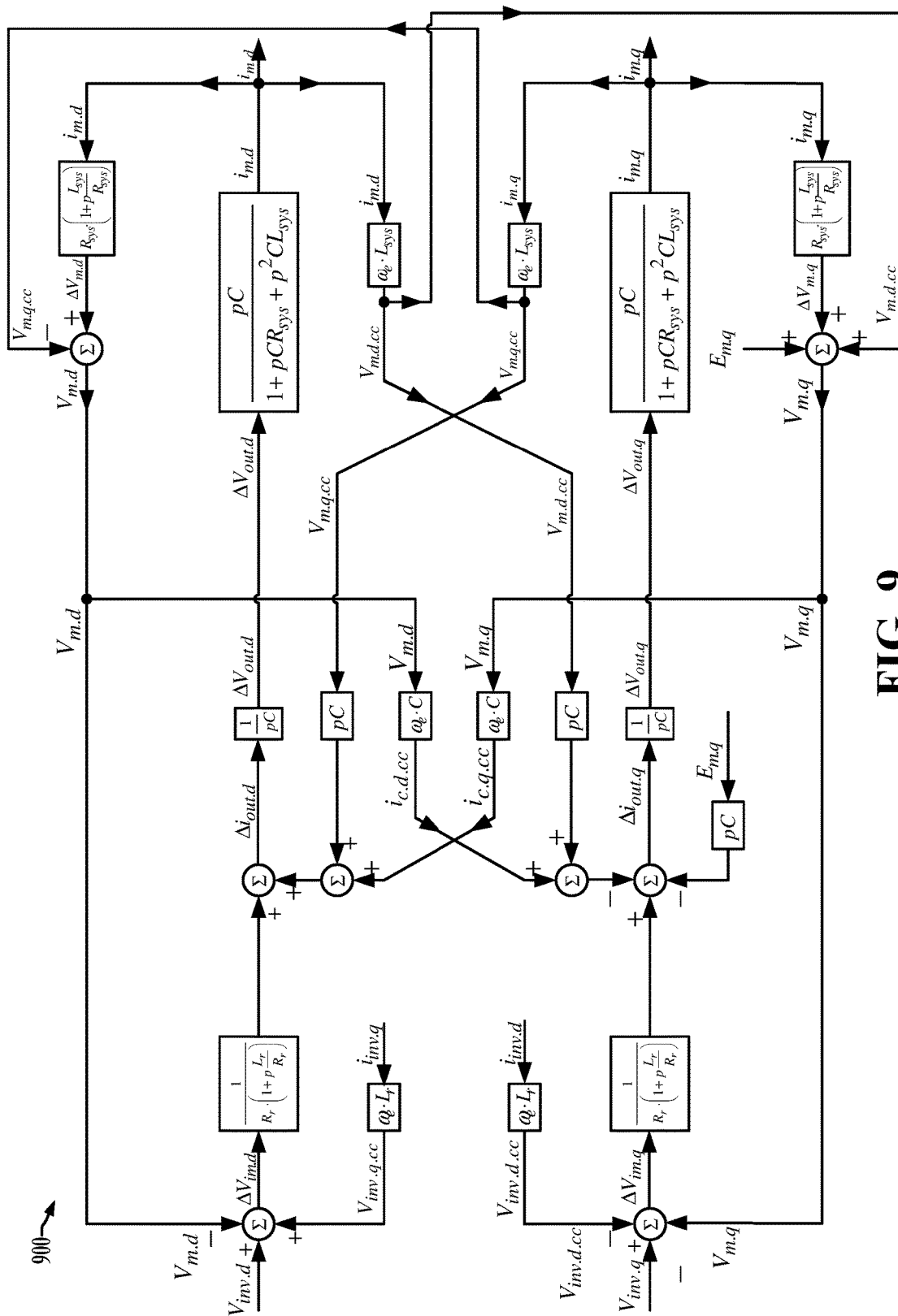

According to equations (53)-(56), the object control block diagram can be redrawn as a second step of a transformation as seen in the diagram 900 of FIG. 9, and the new current control transfer function H can be rewritten as follows:

$$H_{im.d/\Delta iout.d}(p) = \frac{i_{m.d}(p)}{\Delta i_{out.d}} = H_{im.q/\Delta iout.q}(p) = \quad (57)$$

$$\frac{i_{m.q}(p)}{\Delta i_{out.q}} = \frac{1}{pC} \cdot \frac{pC}{1 + pCR_{sys} + p^2 CL_{sys}} = \frac{1}{1 + pCR_{sys} + p^2 CL_{sys}}$$

Figure 10:
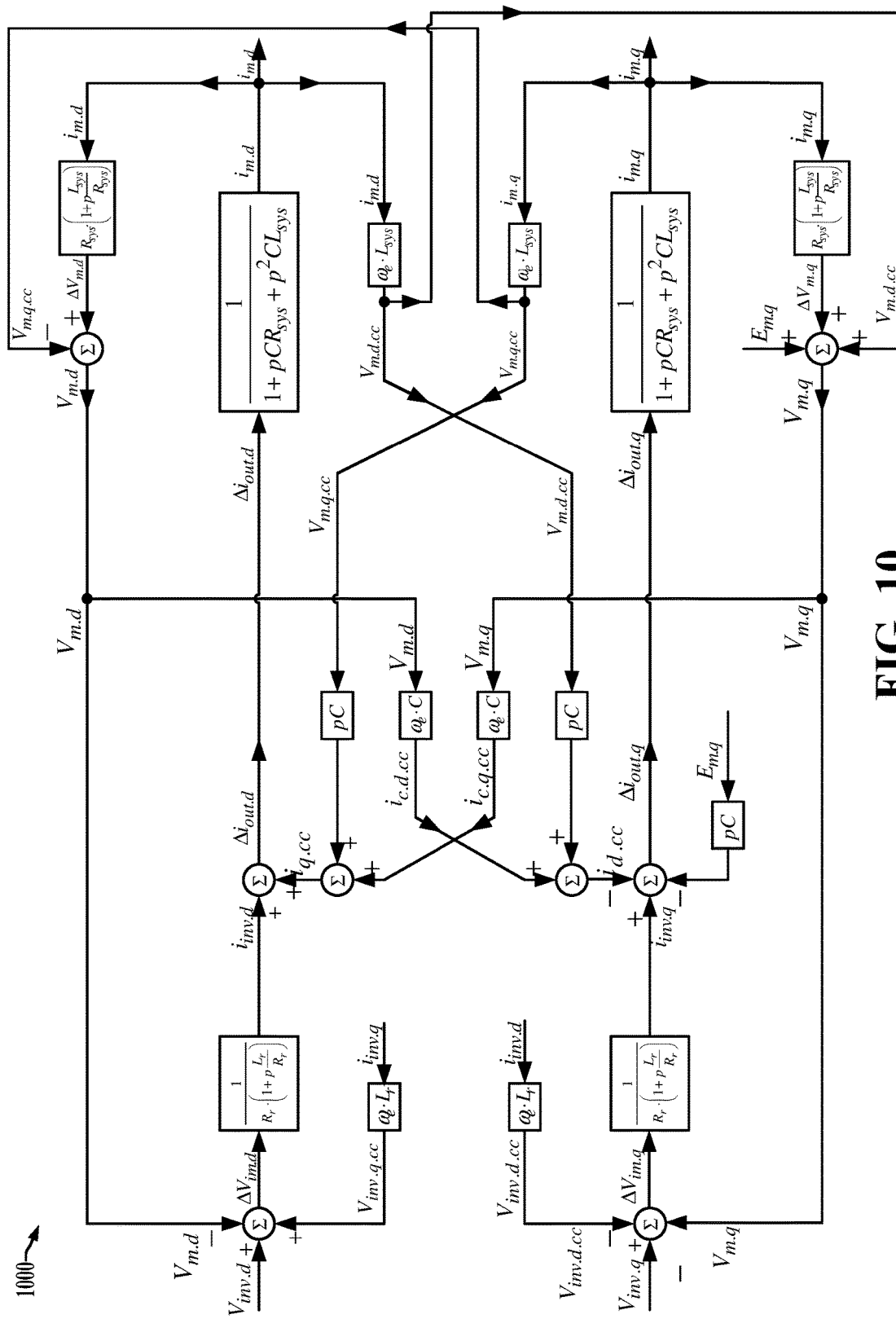

According to equation (57), the object can be redrawn as shown in the diagram 100 of FIG. 10 as a third step of a transformation. The following equations (58) and (59) can be obtained according to FIG. 10:

$$\Delta i_{out.d} = V_{im.d} \cdot \frac{1}{R_r \cdot \left(1 + p\frac{L_r}{R_r}\right)} + i_{q.cc} = \quad (58)$$

$$\frac{1}{R_r \cdot \left(1 + p\frac{L_r}{R_r}\right)} \cdot \left[V_{im.d} + i_{q.cc} \cdot R_r \cdot \left(1 + p\frac{L_r}{R_r}\right)\right]$$

$$\Delta i_{out.q} = V_{im.q} \cdot \frac{1}{R_r \cdot \left(1 + p\frac{L_r}{R_r}\right)} - i_{d.cc} - pC \cdot E_{m.q} = \frac{1}{R_r \cdot \left(1 + p\frac{L_r}{R_r}\right)} \cdot \quad (59)$$

$$\left[V_{im.q} - i_{d.cc} \cdot R_r \cdot \left(1 + p\frac{L_r}{R_r}\right) - pC \cdot E_{m.q} \cdot R_r \cdot \left(1 + p\frac{L_r}{R_r}\right)\right]$$

Figure 11:
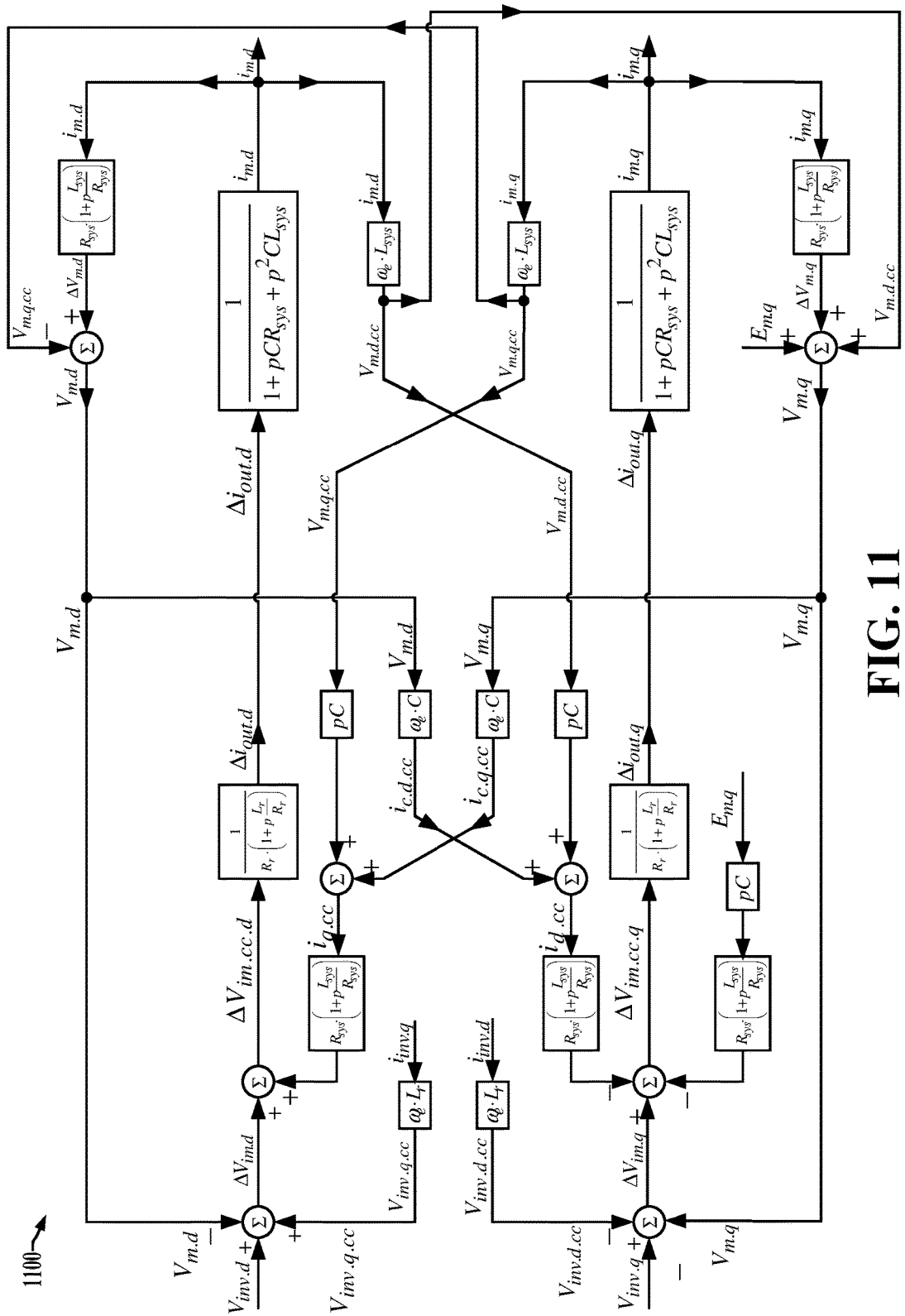

According to equations (58) and (59), the object control block diagram can be redrawn as shown in the diagram 1100 of FIG. 11 as a forth step of a transformation. According to FIG. 11 new transfer functions H can be written as follows:

$$H_{im.d/\Delta Vim.cc.d}(p) = \frac{i_{m.d}(p)}{\Delta V_{im.cc.d}(p)} = H_{im.q/\Delta Vim.cc.q}(p) = \quad (60)$$

$$\frac{i_{m.q}(p)}{\Delta V_{im.cc.q}(p)} = \frac{1}{R_r \cdot \left(1 + p\frac{L_r}{R_r}\right) \cdot (1 + pCR_{sys} + p^2 CL_{sys})}$$

Figure 12:
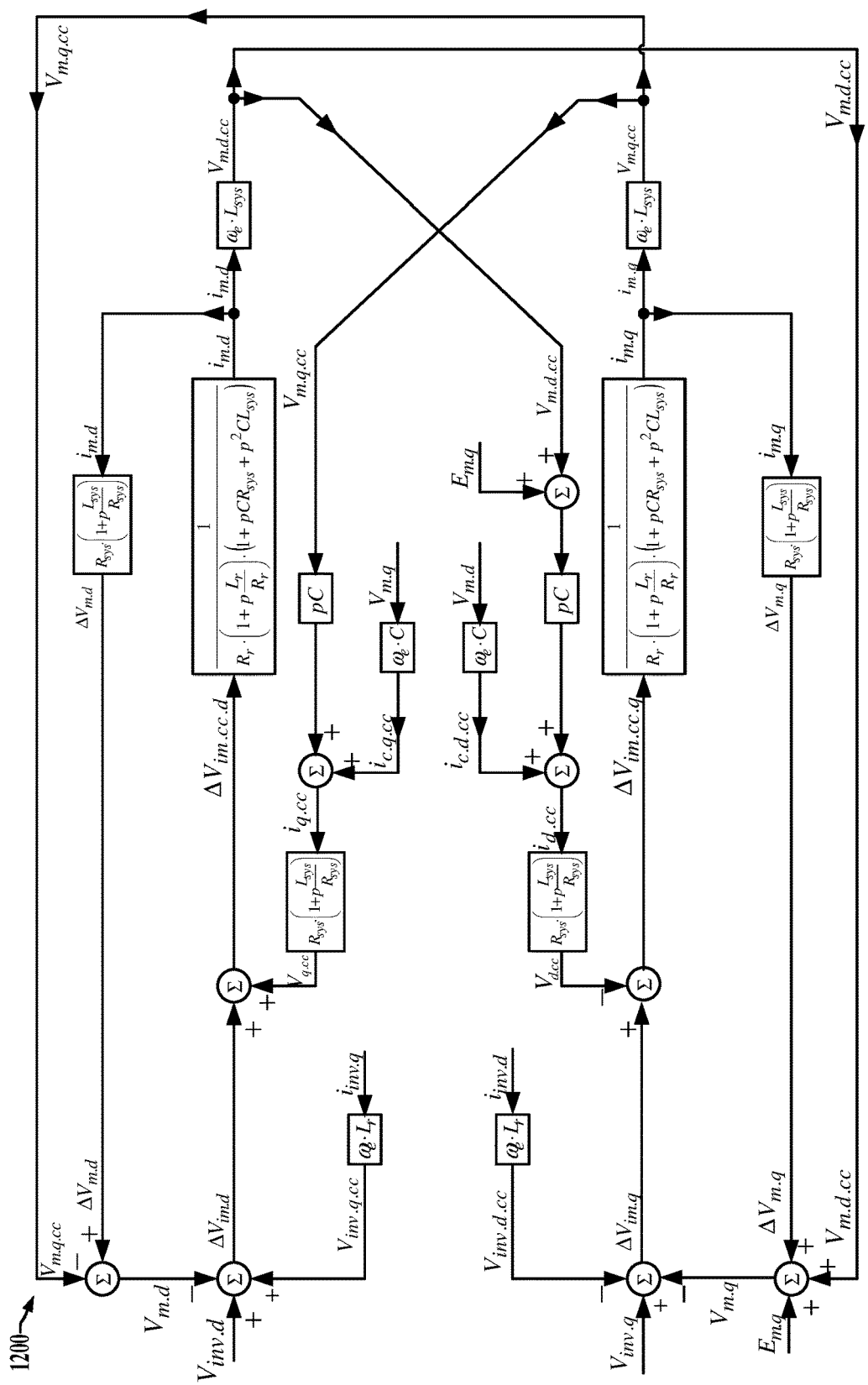

According to equation (60), and the fact that output voltages ($V_{m.d}$, $V_{m.q}$) of the filter are independent variables (measurable variables), the object control block diagram can be redrawn as shown in the diagram 1200 of FIG. 12 as a fifth step of a transformation.

According to FIG. 11 we can write the following equations:

$$\Delta V_{im.cc.d} = [(V_{inv.d} + V_{inv.q.cc}) + V_{m.q.cc} + V_{q.cc}] - \Delta V_{m.d} \quad (61)$$

$$\Delta V_{im.cc.q} = [(V_{inv.q} - V_{inv.d.cc} - E_{m.q}) - V_{m.d.cc} - V_{d.cc}] - \Delta V_{m.q} \quad (62)$$

Figure 13:
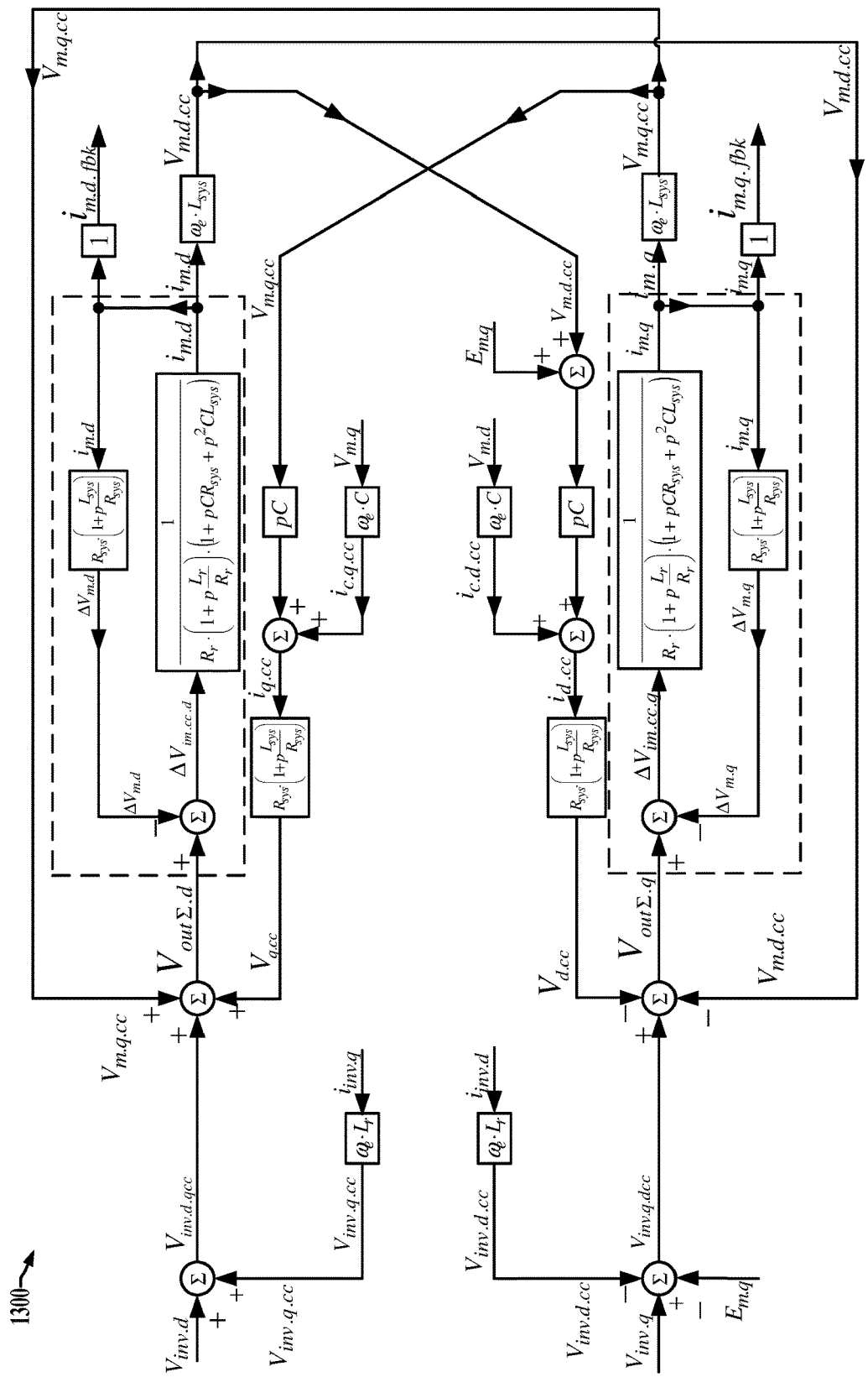

According to equations (61) and (62) the object control block diagram can be redrawn as shown in the diagram 1300 of FIG. 13 as a sixth step of a transformation. According to the block diagram transformation law for closed loops and the diagram 133 of FIG. 13, the following transfer functions H can be written:

$$H_{im.d/Vout\Sigma.d}(p) = \quad (65)$$

$$\frac{i_{m.d}(p)}{V_{out\Sigma.d}(p)} = \frac{\frac{1}{R_r \cdot \left(1 + p\frac{L_r}{R_r}\right) \cdot (1 + pCR_{sys} + p^2 CL_{sys})}}{1 + \frac{R_r \cdot \left(1 + p\frac{L_r}{R_r}\right) \cdot (1 + pCR_{sys} + p^2 CL_{sys})}{R_{sys} \cdot \left(1 + p\frac{L_{sys}}{R_{sys}}\right)}} =$$

-continued $$\frac{1}{R_r \cdot \left(1 + p\frac{L_r}{R_r}\right) \cdot (1 + pCR_{sys} + p^2CL_{sys}) + R_{sys} \cdot \left(1 + p\frac{L_{sys}}{R_{sys}}\right)}$$

After some manipulation the following can be derived:

$$H_{im,d/Vout\Sigma,d}(p) = \qquad (66)$$

$$\frac{i_{m,d}(p)}{V_{out\Sigma,d}(p)} = \frac{1}{R_\Sigma \cdot \left[\begin{array}{l}1 + p\left(CR_r\frac{R_{sys}}{R_\Sigma} + \frac{L_\Sigma}{R_\Sigma}\right) + \\ p^2\left(CL_r\frac{R_{sys}}{R_\Sigma} + CR_r\frac{L_{sys}}{R_\Sigma}\right) + p^3CL_r\frac{L_{sys}}{R_\Sigma}\end{array}\right]}$$

where:

$$R_\Sigma = R_{sys} + R \qquad (67)$$

$$L_\Sigma = L_{sys} + L_r \qquad (68)$$

The transfer function can be further simplified according to the following equation (69):

$$\frac{1}{R_\Sigma \cdot \left(1 + p\frac{L_{sys}}{R_\Sigma}\right) \cdot (1 + pCR_r + p^2CL_r)} = \qquad (69)$$

$$\frac{1}{R_\Sigma \cdot \left[1 + p\left(CR_r + \frac{L_\Sigma}{R_\Sigma}\right) + p^2\left(CL_r + CR_r\frac{L_{sys}}{R_\Sigma}\right) + p^3CL_r\frac{L_{sys}}{R_\Sigma}\right]}$$

The following assumptions can be made:

Because "$R_{sys} \gg R_r$", then: $\frac{R_{sys}}{R_{sys} + R_r} = \frac{R_{sys}}{R_\Sigma} \approx 1$ (70)

Because "$L_{sys} \gg L_r$", then: $L_\Sigma = L_{sys} + L_r \approx L_{sys}$ (71)

Using the assumptions of equations (70) and (71), the transfer function of equation (66) can be represented as follows:

$$H_{im,d/Vout\Sigma,d}(p) = \qquad (72)$$

$$\frac{i_{m,d}(p)}{V_{out\Sigma,d}(p)} = \frac{1}{R_\Sigma \cdot \left(1 + p\frac{L_{sys,d}}{R_\Sigma}\right) \cdot (1 + pCR_r + p^2CL_r)}$$

For the "q" loop, the following can be written:

$$H_{im,q/Vout\Sigma,q}(p) = \frac{i_{m,q}(p)}{V_{out\Sigma,q}(p)} = \frac{1}{R_\Sigma \cdot \left(1 + p\frac{L_{sys,q}}{R_\Sigma}\right) \cdot (1 + pCR_r + p^2CL_r)} \qquad (73)$$

Figure 14:
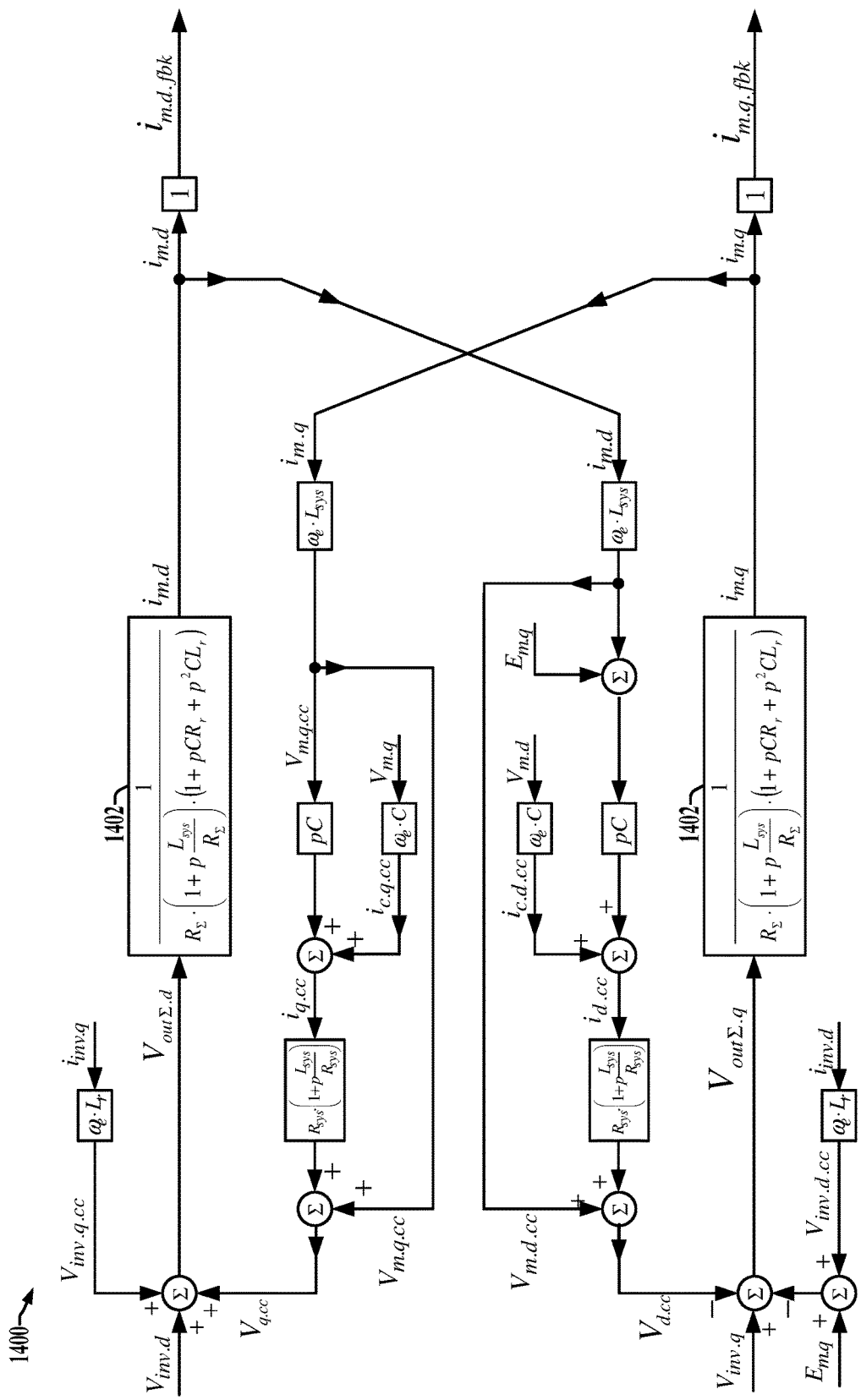

According to equations (72) and (73), the object control block diagram can be redrawn as shown in the diagram 1400 in FIG. 14 as a seventh step of a transformation. As seen in FIG. 14 and the subsequent simplification transformations, the object now includes a transfer function 1402 per equations (72) and (73) for the respective d and q-axis compu- tational paths in the object. Moreover, this example transfer function 1402 represents the output filter 30, the transformer 50, the cable 60 and the motor load 24 use in computing the current feedback value for use by the PI controller components 112.

Figure 15:
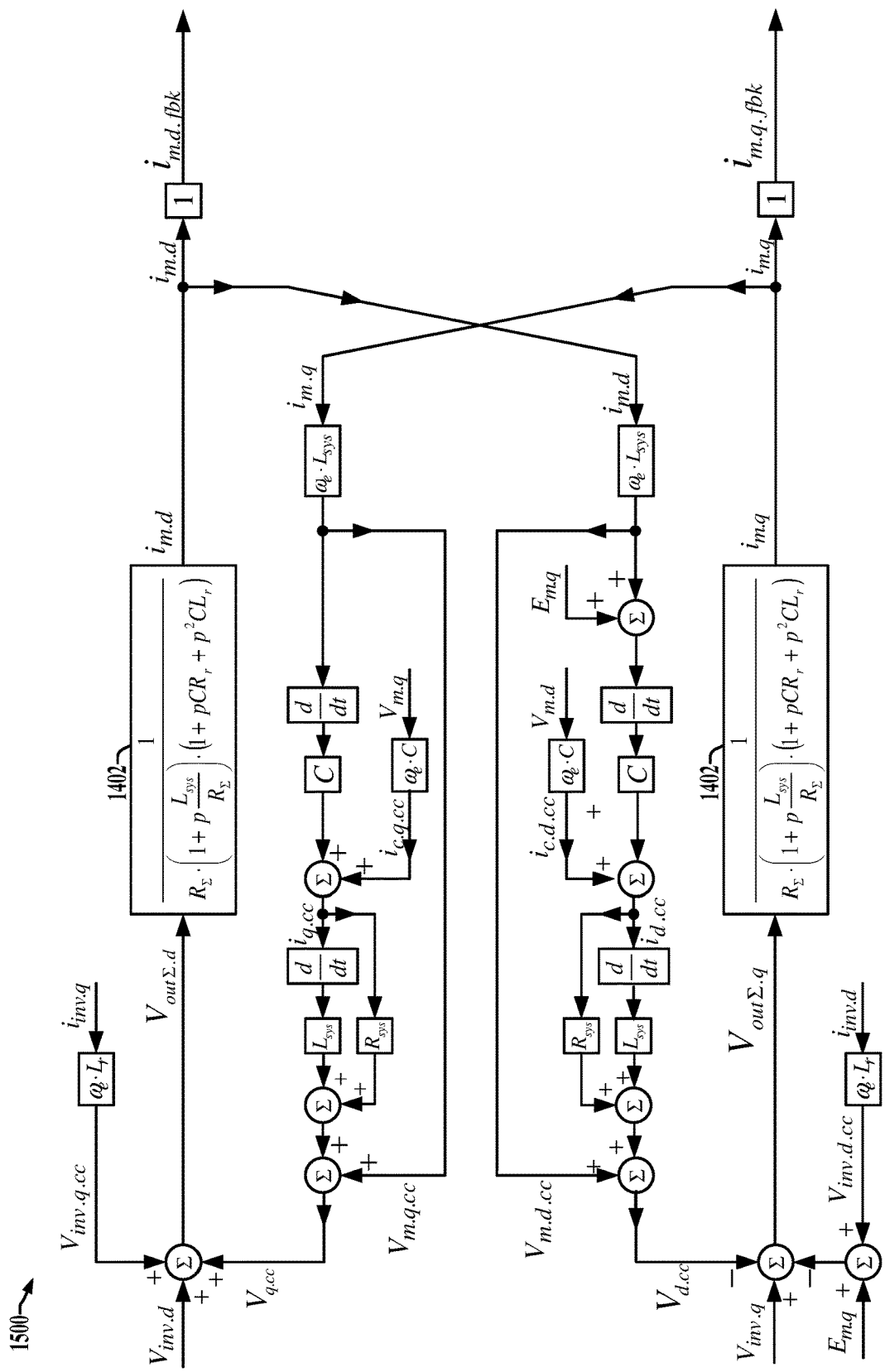
Figure 16:
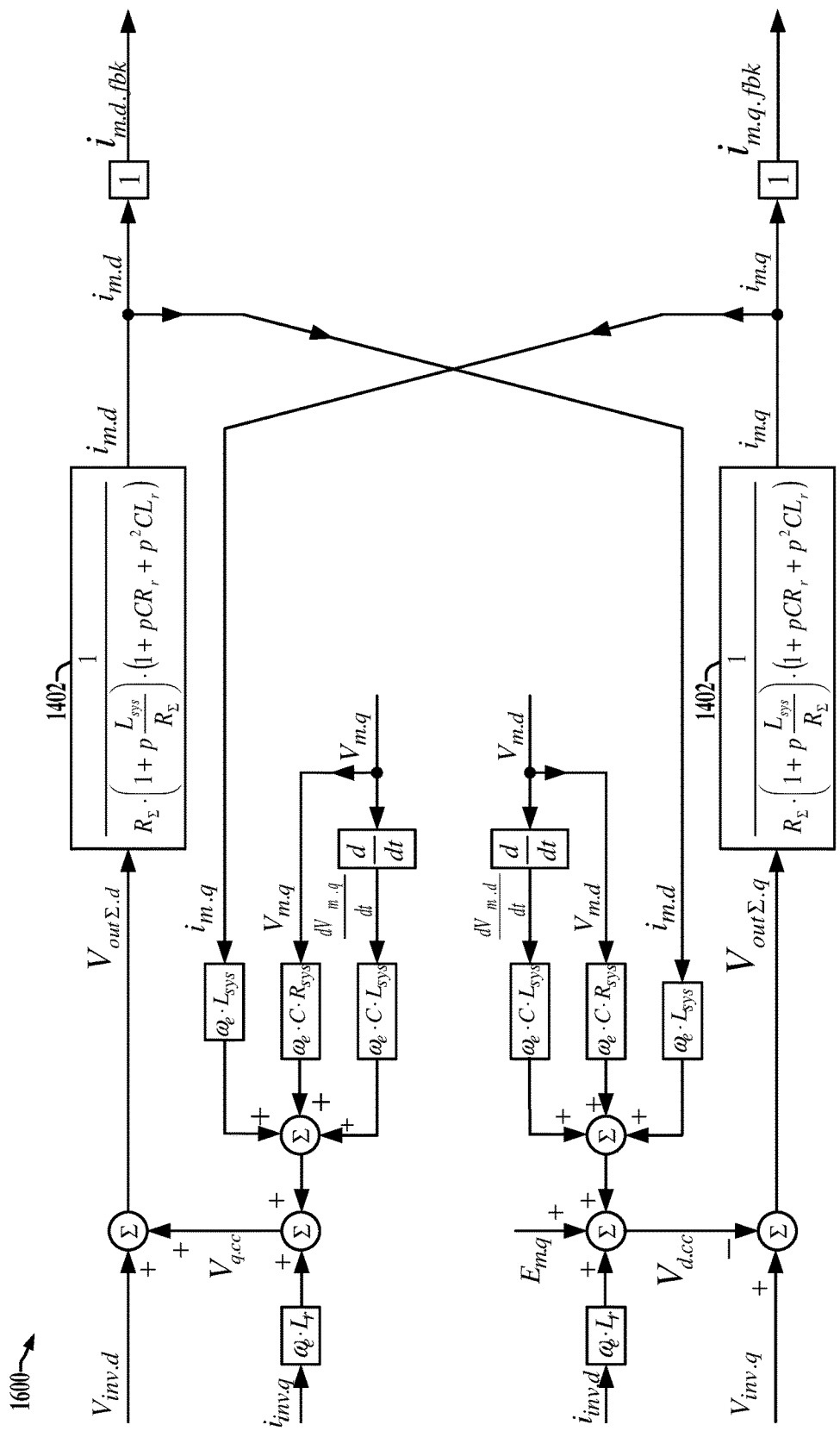

In an eighth transformation step, the object model block diagram can be redrawn as shown in a diagram 1500 of FIG. 15. In this step, the derivatives in the cross-coupled paths of the object are changed from "p" to "d/dt". The diagram 1500 at this stage includes both first and second derivative of some variables. For computational efficiency, it may be impractical to implement second or higher order derivatives and associated computations, and for compensation purposes it may be more practical to use only first derivatives and steady-state values of certain variables due to noise issues. Accordingly, FIG. 16 illustrates a redrawn diagram 1600 in which the object is characterized with first derivatives and steady-state variables only the as a ninth transformation step. In a $10^{th}$ transformation step, the object can be further simplified as shown in the diagram 1700 of FIG. 17 using two assumptions. First, assuming that current $I_{inv,d,q}$ and current $i_{m,d,q}$ are similar (i.e., the filter capacitor current is small), and also assuming that the term "$\omega_e \cdot L_r$" is significantly less than the term "$\omega_e \cdot L_{sys}$", the relationship between the inverter output current and the motor current can be characterized according to the following equation (74):

$$i_{inv,d,q} \cdot \omega_e \cdot L_r + i_{m,d,q} \cdot \omega_e \cdot L_{sys} = i_{m,d,q} \cdot \omega_e \cdot L_\Sigma \qquad (74)$$

where:

$$L_\Sigma = L_{sys} + L_r \qquad (75)$$

Figure 17:
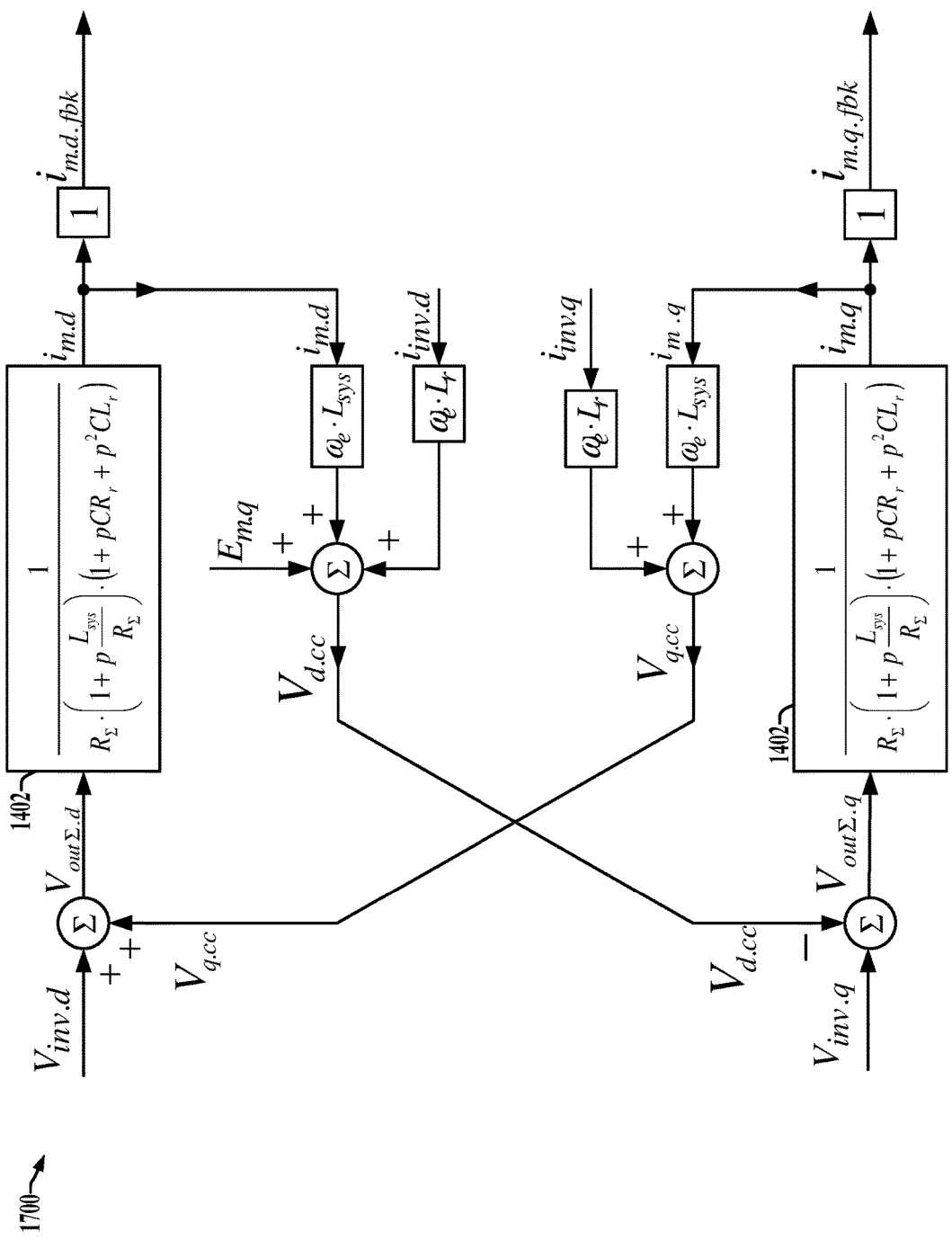
Figure 18:
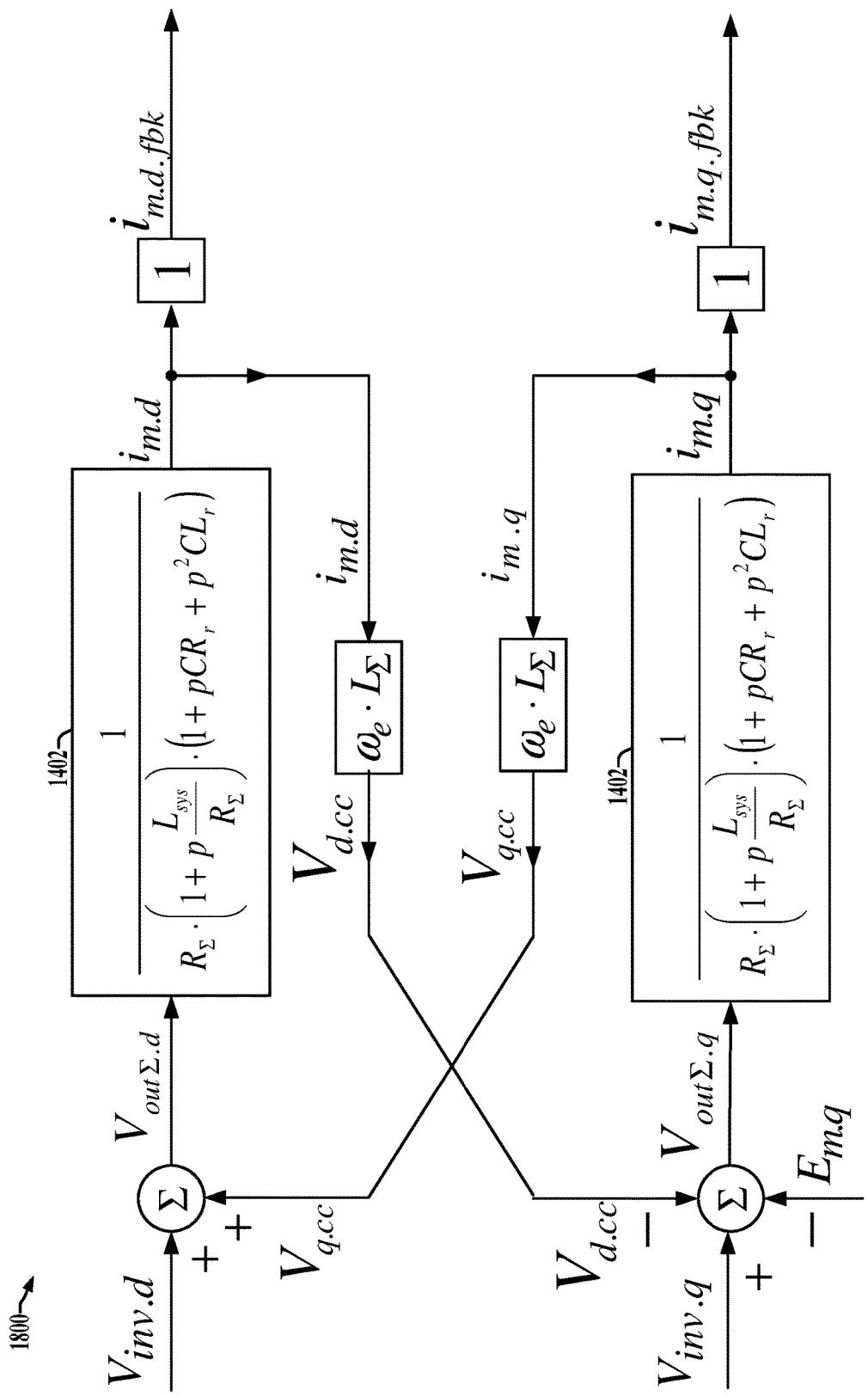
Figure 19:
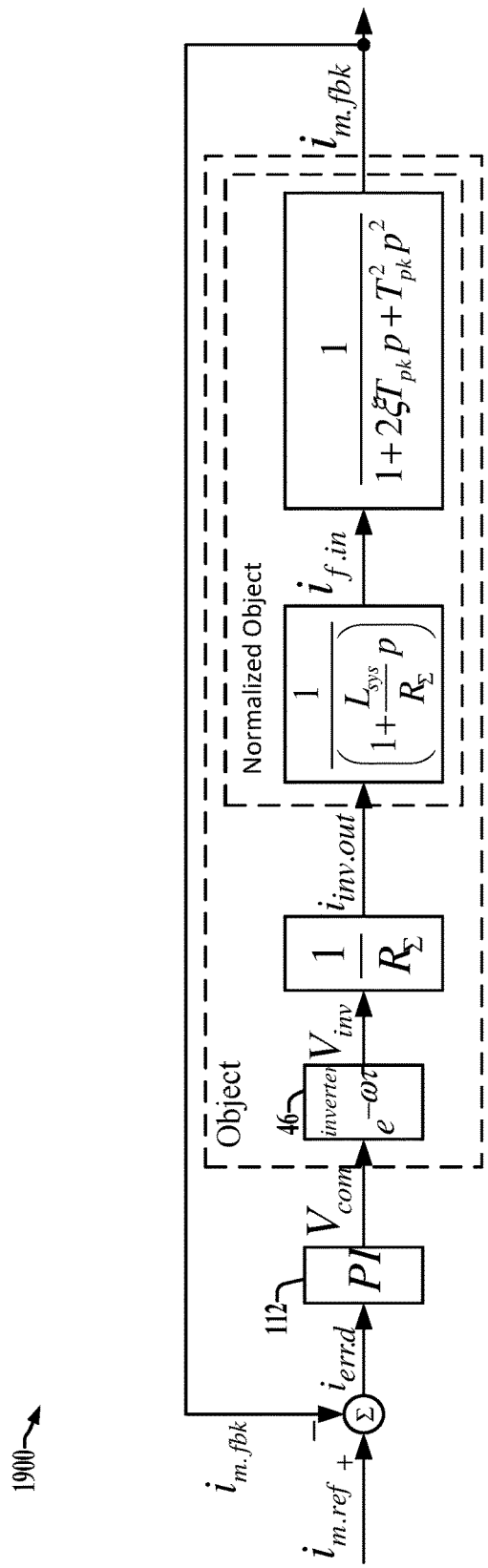

The above assumptions are generally valid in a variety of systems that employ an output filter 30, a transformer 50, and a lengthy cable 60 to drive a motor load 20, such as oil pump applications, particularly at quasi steady-state operation where voltage derivatives are not get really large values. Furthermore, practically the value of term "$\omega_e \cdot C \cdot L_{sys}$" is often less than 0.01 and so it will bring only 1% or less of the $$\text{"} \frac{dV_{m,d,q}}{dt} \text{"}$$

value to the total cross-coupling terms. Accordingly, it is possible to remove some of the above derivative terms and use only study-state terms for cross-coupling in the object. The diagram 1700 in FIG. 17 illustrates transformation of the object model using study-state cross-coupling without the assumption of equation (74), and the diagram 1800 in FIG. 18 illustrates transformation of the object model using study-state cross-coupling along with the assumption of equation (74). FIG. 19 illustrates a representation 1900 showing general closed-loop control for "d" and "q" components according to this object model with normalized second order unit. In FIG. 19, the following relationships are used:

On the FIG. 19: $\xi = \frac{R_r}{2} \cdot \sqrt{\frac{C}{L_r}}$ (76)

$$T_{pk} = \frac{1}{\omega_{pk}} = \sqrt{CL_r} \qquad (77)$$

Figure 20:
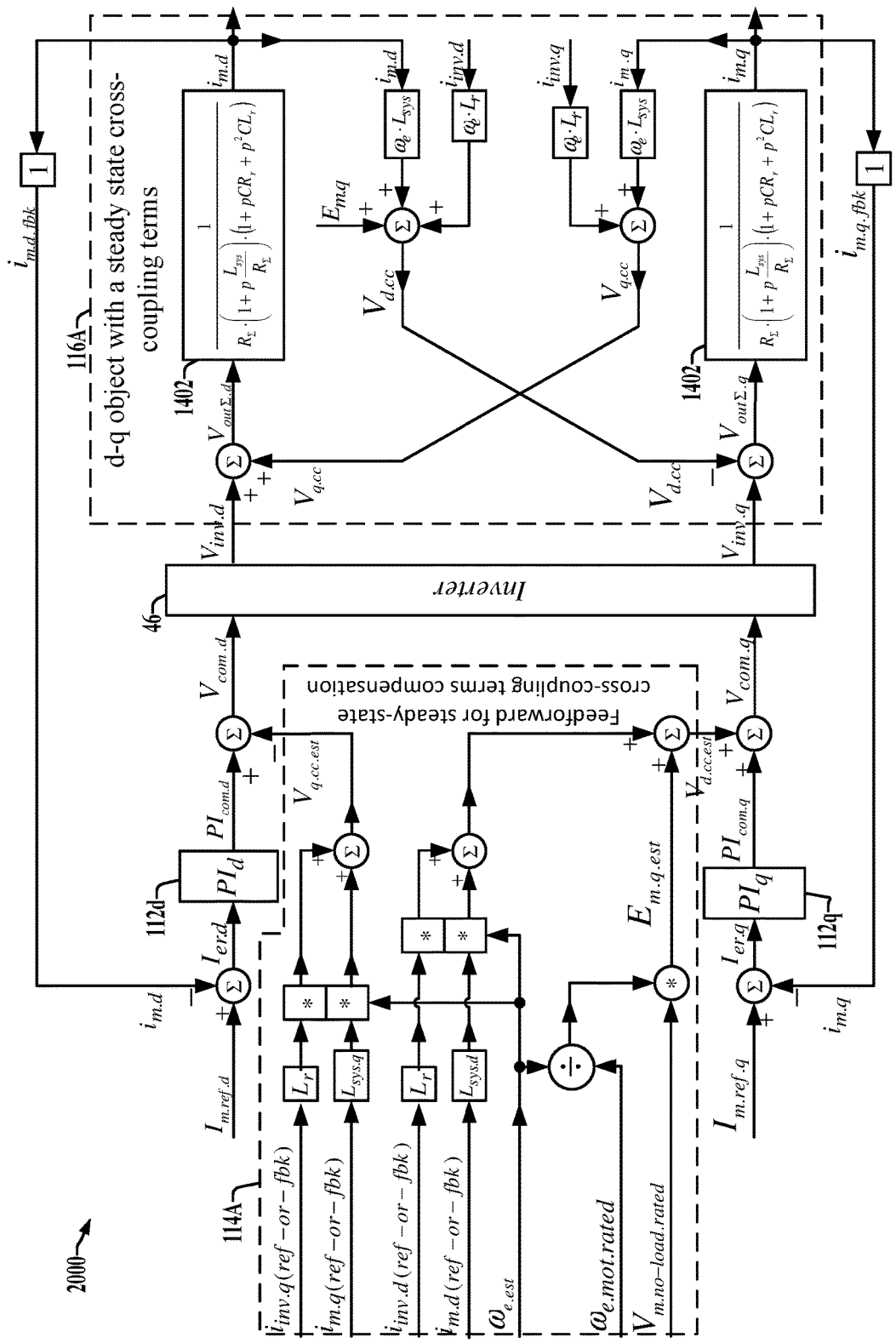
Figure 21:
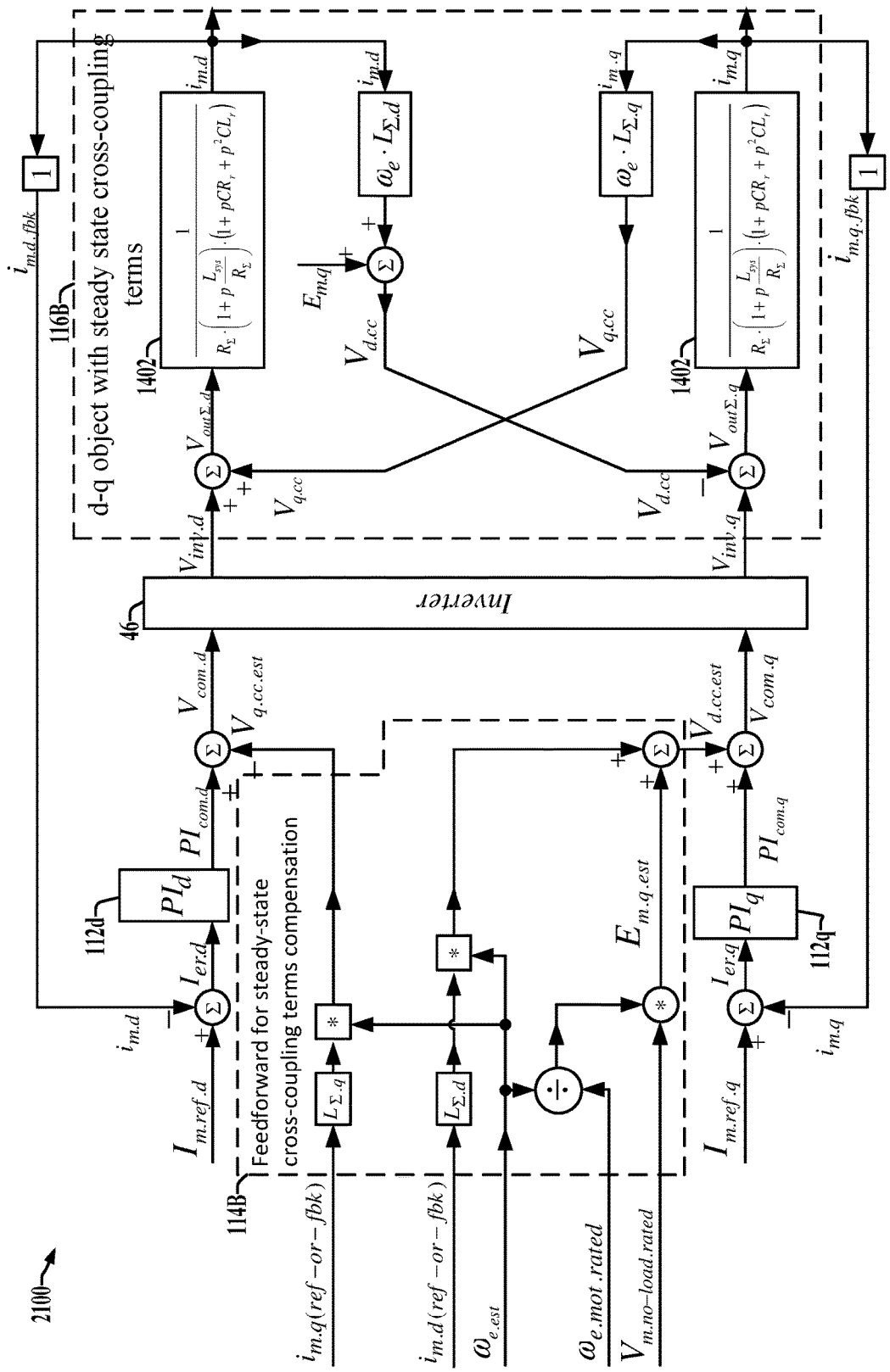

Referring also to FIGS. 20 and 21, cross-coupled feedforward terms of the feedforward component 114 are illustrated respectively for the objects of FIGS. 17 and 18 (respectively with and without the assumption of equation (74) above. The example of FIG. 20 illustrates a current loop control diagram 2000 with a feedforward component 114A shown in FIG. 17 (without assumption of the above equation (74)), and a d-q object component 116A. The example of FIG. 21 shows a current control loop diagram 2100 with the feedforward component 114 of FIG. 18 (using the assumption of equation (74)) and a d-q object 116B. In the examples of FIGS. 20 and 21, the feedforward objects 114 compensate for steady-state cross-coupling to facilitate improved proportional-integral control operation of the control components 112$d$ and 112$q$. In certain examples, the cross-coupled feedforward component 114 computes the estimated d-axis voltage value $V_{,d.cc.est}$ according to a reference or feedback q-axis motor current value $I_{m,qref}$, $I_{m,qfbk}$ and an estimated inverter electrical frequency $\omega_{e.est}$. The cross-coupled feedforward component 114 computes the estimated q-axis voltage value $V_{,d.cc.est}$ according to a reference or feedback d-axis motor current value $I_{m,dref}$, $I_{m,dfbk}$ and the estimated inverter electrical frequency $\omega_{e.est}$. As further shown in FIG. 20, the feedforward component 114 in certain examples computes the estimated d-axis voltage value $V_{,d.cc.est}$ according to a reference or feedback q-axis inverter current value $I_{inv,qref}$, $I_{inv,qfbk}$ and the estimated inverter electrical frequency $\omega_{e.est}$, and the cross-coupled feedforward component 114 computes the estimated q-axis voltage value $V_{,q.cc.est}$ according to a reference or feedback d-axis inverter current value $I_{inv,dref}$, $I_{inv.dfbk}$ and the estimated inverter electrical frequency $\omega_{e.est}$.

In the examples of FIGS. 20 and 21, moreover, the cross-coupled object component 116 computes the d-axis motor voltage value $V_{d.cc}$ according to the d-axis motor current feedback value $i_{m.d}$, and wherein the cross-coupled object component 116 computes the q-axis motor voltage value $V_{q.cc}$ according to the q-axis motor current feedback value $i_{m.d}$. In the example of FIG. 20, the cross-coupled object component 116 computes the d-axis motor voltage value $V_{d.cc}$ according to a d-axis inverter current feedback value $I_{inv.d}$, and computes the q-axis motor voltage value $V_{q.cc}$ according to a q-axis inverter current feedback value $i_{m.d}$. As detailed further in FIGS. 20 and 21, the cross-coupled object component 116 in one example computes a d-axis output voltage value $V_{out\Sigma.d}$ by adding a q-axis motor voltage value $V_{q.cc}$ to a d-axis inverter voltage value $V_{inv.d}$; and the object component 116 computes a d-axis motor current feedback value $i_{m.d}$ according to the d-axis output voltage value $V_{out\Sigma.d}$ using the plant transfer function 1402. In this example, moreover, the object component 116 computes a q-axis output voltage value $V_{out\Sigma.q}$ by subtracting a d-axis motor voltage value $V_{d.cc}$ from a q-axis inverter voltage value $V_{inv.q}$; and the cross-coupled object component 116 computes a q-axis motor current feedback value $i_{m.q}$ according to the q-axis output voltage value $V_{out\Sigma.q}$ using the plant transfer function 1402.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
    an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an intervening output filter, a transformer and a cable; and
    a controller, including:
        a current regulator component implemented by a processor to compute a command value according to a current reference value and a motor current feedback value,
        a cross-coupled feedforward component implemented by the processor to compensate the command value by an estimated cross-coupled voltage value to compute a control output value, and
        a cross-coupled object component implemented by the processor to compute the motor current feedback value according to a voltage value using a plant transfer function representing the output filter, the transformer, the cable and the motor load;
    the controller being operative to provide the inverter switching control signals to control the inverter according to the control output value;
    wherein the current regulator component computes a d-axis command value according to a d-axis current reference value and a d-axis motor current feedback value, and computes a q-axis command value according to a q-axis current reference value and a q-axis motor current feedback value; and
    wherein the cross-coupled feedforward component compensates the d-axis command value by subtracting an estimated q-axis voltage value from the d-axis command value to compute a d-axis control output value, and wherein the cross-coupled feedforward component compensates the q-axis command value by adding an estimated d-axis voltage value to the q-axis command value to compute a q-axis control output value.

2. The power conversion system of claim 1, wherein the cross-coupled feedforward component computes the estimated q-axis voltage value according to an estimated q-axis motor back EMF value.

3. The power conversion system of claim 1, wherein the cross-coupled feedforward component computes the estimated d-axis voltage value according to a reference or feedback q-axis motor current value and an estimated inverter electrical frequency, and wherein the cross-coupled feedforward component computes the estimated q-axis voltage value according to a reference or feedback d-axis motor current value and the estimated inverter electrical frequency.

4. The power conversion system of claim 3, wherein the cross-coupled feedforward component computes the estimated d-axis voltage value according to a reference or feedback q-axis inverter current value and the estimated inverter electrical frequency, and wherein the cross-coupled feedforward component computes the estimated q-axis voltage value according to a reference or feedback d-axis inverter current value and the estimated inverter electrical frequency.

5. The power conversion system of claim 1,
    wherein the cross-coupled object component computes a d-axis output voltage value by adding a q-axis motor voltage value to a d-axis inverter voltage value;

wherein the cross-coupled object component computes a d-axis motor current feedback value according to the d-axis output voltage value using the plant transfer function;

wherein the cross-coupled object component computes a q-axis output voltage value by subtracting a d-axis motor voltage value from a q-axis inverter voltage value; and wherein the cross-coupled object component computes a q-axis motor current feedback value according to the q-axis output voltage value using the plant transfer function.

6. The power conversion system of claim 5, wherein the cross-coupled object component computes the d-axis motor voltage value according to a q-axis motor back EMF value.

7. The power conversion system of claim 5, wherein the cross-coupled object component computes the d-axis motor voltage value according to the d-axis motor current feedback value, and wherein the cross-coupled object component computes the q-axis motor voltage value according to the q-axis motor current feedback value.

8. The power conversion system of claim 7, wherein the cross-coupled object component computes the d-axis motor voltage value according to a d-axis inverter current feedback value ($I_{inv\_d}$), and wherein the cross-coupled object component computes the q-axis motor voltage value according to a q-axis inverter current feedback value.

9. A method of operating an inverter to drive a motor load through an output filter and a transformer, the method comprising:

implementing a current regulator component to compute a command value according to a current reference value and a motor current feedback value;

implementing a cross-coupled feedforward component to compensate the command value by an estimated cross-coupled voltage value to compute a control output value;

implementing a cross-coupled object component to compute the motor current feedback value according to a voltage value using a plant transfer function representing the output filter, the transformer, the cable and the motor load; and providing inverter switching control signals to control the inverter according to the control output value;

further comprising implementing the current regulator component to compute a d-axis command value according to a d-axis current reference value and a d-axis motor current feedback value, and to compute a q-axis command value according to a q-axis current reference value and a q-axis motor current feedback value; and further comprising implementing the cross-coupled feedforward component to compensate the d-axis command value by subtracting an estimate q-axis voltage value from the d-axis command value to compute a d-axis control output value, and implementing the cross-coupled feedforward component to compensate the q-axis command value by adding an estimated d-axis voltage value to the q-axis command value to compute a q-axis control output value.

10. The method of claim 9, wherein the cross-coupled feedforward component computes the estimated q-axis voltage value according to an estimated q-axis motor back EMF value.

11. The method of claim 9, further comprising implementing the cross-coupled feedforward component to compute the estimated d-axis voltage value according to a reference or feedback q-axis motor current value and an estimated inverter electrical frequency, and implementing the cross-coupled feedforward component to compute the estimated q-axis voltage value according to a reference or feedback d-axis motor current value and the estimated inverter electrical frequency.

12. The method of claim 11, further comprising implementing the cross-coupled feedforward component to compute the estimated d-axis voltage value according to a reference or feedback q-axis inverter current value and the estimated inverter electrical frequency, and implementing the cross-coupled feedforward component to compute the estimated q-axis voltage value according to a reference or feedback d-axis inverter current value and the estimated inverter electrical frequency.

13. The method of claim 9, further comprising:

implementing the cross-coupled object component to compute a d-axis output voltage value by adding a q-axis motor voltage value to a d-axis inverter voltage value;

implementing the cross-coupled object component to compute a d-axis motor current feedback value according to the d-axis output voltage value using the plant transfer function;

implementing the cross-coupled object component to compute a q-axis output voltage value by subtracting a d-axis motor voltage value from a q-axis inverter voltage value; and implementing the cross-coupled object component to compute a q-axis motor current feedback value according to the q-axis output voltage value using the plant transfer function.

14. The method of claim 13, further comprising implementing the cross-coupled object component to compute the d-axis motor voltage value according to a q-axis motor back EMF value.

15. The method of claim 13, further comprising implementing the cross-coupled object component to compute the d-axis motor voltage value according to the d-axis motor current feedback value, and comprising implementing the cross-coupled object component to compute the q-axis motor voltage value according to the q-axis motor current feedback value.

16. A non-transitory computer readable medium including computer executable instructions which, when executed by a processor, cause the processor to:

compute a command value according to a current reference value and a motor current feedback value;

compensate the command value by an estimated cross-coupled voltage value to compute a control output value;

compute the motor current feedback value according to a voltage value using a plant transfer function representing the output filter, the transformer, the cable and the motor load; and control the inverter according to the control output value$_i$, compute a d-axis command value according to a d-axis current reference value and a d-axis motor current feedback value, and compute a q-axis command value according to a q-axis current reference value and a q-axis motor current feedback value; and compensate the d-axis command value by subtracting an estimated q-axis voltage value from the d-axis command value to compute a d-axis control output value, and compensate the q-axis command value by adding an estimated d-axis voltage value to the q-axis command value to compute a q-axis control output value.

* * * * *